US008287213B2

(12) United States Patent
Kramer

(10) Patent No.: US 8,287,213 B2
(45) Date of Patent: *Oct. 16, 2012

(54) INDEXABLE CUTTING TOOL INSERT FOR CUTTING TOOLS

(75) Inventor: Rodney M. Kramer, Rockford, IL (US)

(73) Assignee: Remark Technologies, Inc., Rockford, IL (US)

( * ) Notice: Subject to any disclaimer, the term of this patent is extended or adjusted under 35 U.S.C. 154(b) by 618 days.

This patent is subject to a terminal disclaimer.

(21) Appl. No.: 12/414,115

(22) Filed: Mar. 30, 2009

(65) Prior Publication Data

US 2009/0245953 A1 Oct. 1, 2009

Related U.S. Application Data

(63) Continuation-in-part of application No. 11/355,448, filed on Feb. 16, 2006, now Pat. No. 7,510,353.

(51) Int. Cl.
*B23B 27/16* (2006.01)
*B23C 5/20* (2006.01)
(52) U.S. Cl. .......................................... 407/113; 407/66
(58) Field of Classification Search .................. 407/34, 407/42, 51, 53, 61, 62, 63, 67, 66, 113–117
See application file for complete search history.

(56) References Cited

U.S. PATENT DOCUMENTS

| 3,662,444 A | 5/1972 | Erkfritz |
| 3,701,187 A | 10/1972 | Erkfritz |
| 3,716,900 A | 2/1973 | Erkfritz |
| 4,898,500 A | 2/1990 | Nakamura et al. |
| 5,667,343 A | 9/1997 | Hessman et al. |
| 5,707,185 A | 1/1998 | Mizutani |
| 5,712,030 A | 1/1998 | Goto et al. |
| 5,752,155 A | 5/1998 | Gates, Jr. et al. |
| 5,762,453 A | 6/1998 | Arai et al. |
| 5,809,848 A | 9/1998 | Viswanadham et al. |

(Continued)

FOREIGN PATENT DOCUMENTS
WO 2007098347 8/2007

OTHER PUBLICATIONS

Notification of Transmittal of the International Search Report and the Written Opinion of the International Searching Authority, or the Declaration from the International Bureau of WIPO for International Application No. PCT/US2010/029057 dates Nov. 9, 2010, 9 pages.

(Continued)

*Primary Examiner* — Will Fridie, Jr.
(74) *Attorney, Agent, or Firm* — Fitch Even Tabin & Flannery, LLP

(57) ABSTRACT

An insert is disclosed for use in cutting tool applications having two major faces and at least two cutting edges. The insert is indexable by repositioning the cutting insert from one face to the other face. The inserts may be mounted in a seat formed in a fixed cutting tool. The seat has a major seating surface for mounting the insert and for receiving a retainer at a predetermined angle. In one form, the seat may also have dovetail walls oriented to engage side walls of the insert and to reduce the shear force against the retainer during contact between the insert and a rotating workpiece. The fixed tool has reliefs and a tip pocket to protect an unused cutting edge on the insert.

16 Claims, 16 Drawing Sheets

U.S. PATENT DOCUMENTS

| | | | |
|---|---|---|---|
| 5,924,824 A * | 7/1999 | Satran et al. | 407/34 |
| 5,976,707 A | 11/1999 | Grab | |
| 6,161,990 A | 12/2000 | Oles et al. | |
| 6,503,028 B1 | 1/2003 | Wallstrom | |
| 6,540,448 B2 | 4/2003 | Johnson | |
| 6,607,335 B2 | 8/2003 | Morgulis | |
| 6,709,205 B2 | 3/2004 | Morgulis et al. | |
| 6,742,969 B1 | 6/2004 | Hoefler | |
| 6,769,844 B2 | 8/2004 | Waggle | |
| 6,773,209 B2 | 8/2004 | Craig | |
| 6,851,897 B2 | 2/2005 | Kubo | |
| 6,921,233 B2 | 7/2005 | Duerr et al. | |
| 6,926,472 B2 | 8/2005 | Arvidsson | |
| 6,929,428 B1 | 8/2005 | Wermeister et al. | |
| 6,929,429 B2 | 8/2005 | Riviere | |
| 6,942,431 B2 | 9/2005 | Pantzar et al. | |
| 6,960,049 B2 | 11/2005 | Inayayama | |
| 6,960,051 B2 | 11/2005 | Koskinen | |
| 7,097,393 B2 * | 8/2006 | Satran et al. | 407/113 |
| 7,134,811 B2 * | 11/2006 | Francis et al. | 407/42 |
| 7,510,353 B2 * | 3/2009 | Kramer | 407/113 |
| 7,753,625 B2 * | 7/2010 | Craig | 407/63 |
| 7,878,738 B2 * | 2/2011 | Kammermeier et al. | 407/114 |
| 2003/0103818 A1 | 6/2003 | Astrom | |
| 2004/0208714 A1 | 10/2004 | Stabel et al. | |
| 2004/0213639 A1 | 10/2004 | Ueda et al. | |
| 2004/0223818 A1 | 11/2004 | Sheffler et al. | |
| 2004/0237723 A1 | 12/2004 | Kanada et al. | |
| 2007/0189860 A1 | 8/2007 | Kramer | |

OTHER PUBLICATIONS

Ingersoll, excerpt from Ingersoll Face Mills Catalog, pp. 3, 4, 6, 7, 10-13, Nov. 9, 2010.

Ingersoll, excerpt from Ingersoll End Mills Catalog, pp. 3, 5, 11-13, 18-19, Nov. 9, 2010.

An International Search Report dated Sep. 19, 2008, from the International Bureau in related International (PCT) Application No. PCT/US2007/062132.

A Written Opinion dated Sep. 19, 2008, from the International Searching Authority in related International (PCT) Application No. PCT/US2007/062132.

* cited by examiner

INDEXABLE CUTTING TOOL INSERT FOR CUTTING TOOLS

CROSS-REFERENCE TO RELATED APPLICATION

This application is a continuation-in-part of U.S. patent application Ser. No. 11/355,448, filed Feb. 16, 2006, which is hereby incorporated herein by reference in its entirety.

FIELD OF THE INVENTION

The present disclosure relates to an insert configured to be mounted to a cutting tool and also relates to the cutting tool on which the insert is mounted.

BACKGROUND OF THE INVENTION

Cutting inserts are used in various cutting tools for the machining of workpieces, particularly metallic workpieces. Indexable cutting inserts, formed from material such as sintered carbides or ceramics, are often used in milling operations, such as machining aluminum, cast iron, steel, stainless steel, nickel-based alloys, cobalt alloys, and titanium. Examples of cutting tools that employ inserts in performing milling operations include face mills, end mills, slotters, and lathes.

In some conventional cutting tools, indexable cutting inserts are removably secured in insert seats disposed within pockets and spaced circumferentially around the outer periphery of a tool body. Conventional inserts may have a cutting edge about the outside of the insert, which provides a number of alternately usable cutting edges. In some cutting tools, a polygonal insert has been employed to make effective use of its corners.

Ordinarily, during a cutting operation, only a portion of the cutting edge actually cuts the workpiece. When one cutting position becomes worn, the insert may be "indexed," or repositioned, in the seat in order to bring a fresh cutting edge into the active cutting position. When all of the cutting positions are worn, the insert is discarded and replaced with a new one. In such conventional cutting tools, inserts are generally indexed by rotating them in their respective insert seats about an axis defined by the retainer hole to expose a different cutting edge.

The tool body of a conventional cutting tool often has a circular working end and a plurality of pockets, and chip gullets, positioned about the outside circumference of the working end, and each station contains a seating surface for mounting a cutting insert. An insert seat ordinarily includes one or more seating surfaces for locating, positioning, and orienting the insert in the pocket. One of many methods of retention is a common screw, which passes through a retainer hole in each insert and is threaded into a threaded mounting hole in a seating surface to retain the insert in the pocket. Each chip pocket forms a recess, or indentation, in the tool body located between adjacent insert seats. The chip pockets provide clearance regions for chips cut during the operation of the cutting tool.

A conventional threaded hole is generally perpendicular or slightly angled to the broad top and bottom faces of the insert and to the seating surface supporting the bottom face. During cutting of the workpiece, the inserts commonly experience forces that act to tend to cause the insert to be ejected from the insert pocket. The retainer fastener is the primary means by which the insert is retained in the seat. As a result, the retainer is subject to a shear force that can result in the breaking of the retainer.

In addition, the orientation of the retainer in the insert seat requires the removal of a significant amount of the cutting tool body in front of the insert seat. More specifically, the retainer is oriented approximately perpendicular to the face of the major seating surface, i.e., the seating surface in contact with the bottom face of the insert. As a result, a significant amount of the cutting tool body in front of each major seating surface must be removed to allow the retainer to be screwed in and out of the major seating surface. The removal of this cutting tool body material makes the cross-section smaller, thereby weakening it and shortening its useful life.

In other conventional cutting tools, an indexable cutting insert can be removably secured to a seat on a fixed cutting tool, such as a lathe, and oriented so that cutting edges on the insert project beyond the fixed tool. Most often, the fixed tool is held substantially stationary during machining, while the workpiece rotates about an axis. The fixed cutting insert machines the moving workpiece to remove excess material. Conventional fixed tool inserts commonly have a cutting edge disposed around a periphery of one face of the insert to provide a number of alternately usable cutting edges. During a cutting operation, only a portion of the cutting edge actually cuts the workpiece. When one cutting position becomes worn, the insert is "indexed," or repositioned, in the seat to position a fresh cutting edge in the active cutting position. For these types of cutting tools, the insert is generally indexed by rotating the insert about an axis commonly defined through the retainer hole formed in the insert to rotate the insert about this axis to expose a different cutting edge on the periphery of the insert.

In most cases, conventional cutting tool inserts for these fixed tool applications have a generally flat shape formed by upper and lower major faces oriented generally parallel to each other. The insert has cutting edges disposed around the periphery of only one of the major faces, such as an upper major face, with side walls that taper inwardly toward a smaller, lower major face. In essence, the conventional insert generally has a truncated V-shaped cross section that is wider near the upper major face and narrower near the lower major face with cutting edges about the periphery of the upper major face.

In the tool body, pocket is formed to receive such inserts. Ordinary tool pockets include side walls inclined outwardly to mate with the inclined insert side walls and a major seating surface to retain the insert. When the cutting tool insert is mounted in the seat, the upper major surface of the insert faces away from the lower tool seating surface so that a portion of the insert cutting edges are positioned to contact the workpiece. However, because the cutting edges of prior inserts extend along the same major face, all cutting edges portions, whether or not positioned for machining, tend to have at least a portion thereof exposed to the environment, which allows the unused cutting edges to risk damage from chips, other debris, or handling.

One of the many methods used to retain the cutting insert within the tool seat is a screw, which passes through the retainer hole in the insert and threaded into a mounting hole in the major seating surface to retain the insert in the seat. Typically, the threaded mounting hole is generally perpendicular to the upper and lower major faces of the insert and to the major seating surface of the tool.

SUMMARY OF THE INVENTION

A cutting insert for rotary or fixed tool applications is provided that has cutting edges positioned diagonally opposed across a body of the insert where the cutting edges extend along opposite major faces of the insert body. As a result, an unused cutting edge adjacent one major face (i.e., one that is not exposed for cutting) can be protected when received in a tool body by a portion of the tool body itself at the same time as another cutting edge adjacent the other major face is exposed for cutting. Because the unused cutting edge is protected by the tool body during machining, it is not exposed to the environment and protected from damage due to flying cutting debris, handling, and the like.

In one form, the inserts herein are particularly suited for use in fixed cutting tool applications, such as in a lathe, but may be used in other machining applications as well. Due to the configuration of the cutting edges being diagonally oppositely oriented across the insert bodies and positioned along the edge of opposite major faces, the inserts can be indexed between used and unused cutting edges by flipping them end-over-end as opposed to the rotary indexing of the prior inserts about a retainer hole.

The indexable inserts herein provide advantages over existing indexable inserts for fixed tool applications, which generally have cutting edges positioned only along a single major face. Because of this construction of prior inserts, the unused cutting surfaces, when mounted in a fixed tool holder of a lathe, are still positioned at the outer surface of the cutting tool holder where all cutting edges thereof are exposed to the surrounding environment and, thus, risk damage through contact with flying cutting debris and other objects hitting against the cutting tool and insert. On the other hand, due to the configuration of the cutting edges being positioned diagonally across the cutting insert bodies of the inserts herein, where the unused cutting edge is received in a tool holder with a portion of the holder body covering the unused cutting edges, the inserts herein do not expose an unused cutting edge to such risk of damage.

In one aspect, the indexable cutting inserts herein include a block body with upper and lower opposed major faces and opposite ends thereof. In one form, the major faces of the block body are wider at a location intermediate the opposite ends than at the opposite ends themselves so that the major faces of the insert have a generally diamond-shaped configuration; however, other shapes may also be used depending on the particular application.

The insert also has opposing side walls extending between the major faces where each of the opposing side walls form intersections or junctures with each other at the opposite ends of the block body. In one form, the side walls are inclined relative to a longitudinal axis extending through the opposite ends of the body so that the side walls extends towards each other from the wider intermediate location of the block body to each of the opposite ends. In another form, the side walls form a generally wedge shape from a broad end to a narrow end.

In one form, an upper or first cutting edge is formed at an upper intersection or upper corner juncture extending along one of the opposite side walls and the upper major face. A lower or second cutting edge is formed at a lower intersection or lower corner juncture extending along the same side wall and the lower major face. As a result, in such form, the lower cutting edge is located diagonally across the side wall from the upper cutting edge so that one cutting edge can be exposed for cutting while the other cutting edge located diagonally across the body can be received in protection recesses formed in a cutting tool body for protection.

With the positioning of the cutting edges on the block body, indexing the insert to switch between the protected cutting edge and the exposed cutting edge involves reversing the orientation of the opposed major faces and flipping the insert end-over-end to position the previously protected cutting edge in a working position for machining. By positioning the cutting edges on opposite end portions of the insert and spacing the cutting edges diagonally across the insert body, one cutting edge is exposed to a workpiece while the other is spaced away from the workpiece and can be protected within the tool body.

In contrast, previous insert designs for fixed cutting tool applications have all cutting edges on or adjacent the same major face, and when received in a tool body, these inserts have at least a portion of each cutting edge, whether or not it is exposed for cutting, susceptible to damage because they are still exposed at the outer surface of the tool body. This exposure renders the non-used cutting edge susceptible to damage prior to being used for machining. Due to this configuration of the prior inserts having all cutting edges adjacent a single major surface, these prior inserts were indexed by loosening a fastener which held the insert to the cutting tool and rotating the insert about a center axis until the unused edge was rotated into an operating position faced the workpiece. However, these prior inserts always had a portion of the unused cutting edges exposed and subject to potential damage.

In another aspect, a fixed cutting tool is provided including an indexable cutting tool insert and a cutting tool holder configured to receive the insert. The insert has upper and lower major faces, at least one side wall forming corner junctures with the major faces, and upper and lower cutting edges disposed adjacent upper and lower corner junctures of each major face and the side wall. The tool holder has a seating pocket formed in a working end of the cutting tool holder and configured for receiving the indexable cutting inert therein. The seating pocket has a seating surface for supporting one of the upper or lower major faces of the indexable cutting insert thereon so that one of the upper or lower cutting edges is exposed for cutting while the other cutting edge is protected by a body of the cutting tool holder.

To hold the insert in the pocket, the tool holder body has a side wall of the seating pocket that is inclined over the seating surface and, thus, arranged to hold the indexable cutting insert in the pocket in a direction generally normal to the seating surface. By one approach, the side wall forms a dovetail configuration to aid in holding the insert to the seating surface. A fastener may also be used. To this end, the cutting tool insert side wall may also be inclined in an opposite and complementary fashion to the dovetail inclination of the seating pocket side wall to mate with the tool body. Due to this dovetail configuration of the side walls, loads generating by the machining are applied not only through the fastener, but also through the dovetailed engagement with the insert. By contrast, prior cutting tool designs utilized generally vertical walls or outwardly inclined walls and relied solely on the fasteners as the only structure which would resist movement of the insert away from the tool body. In prior tool bodies, the walls did not resist movement of the tool in a direction normal to the tool's seating surface and the fastener itself was generally the only structure that absorbed loads from the cutting application. The inserts and cutting tools herein, on the other hand, employ the complimentary or dovetail engagement between the inclined surface of the pocket walls and the inclined sides of the insert together with the fastener to decrease the loads applied to the fastener and provide a more robust connection between the insert and the tool body.

To provide protection to the unused cutting edge of the insert, a recess is formed in the tool pocket at an intersection of the dovetailed side wall and the seating surface. This recess is arranged to form a relief area in the seating surface to receive either the upper or lower cutting edge that is not being used for cutting. Thus, the relief area provides protection of the non-used cutting edge during machining because it is not exposed at the outer surface of the tool as with prior inserts and cutting tools, but protected on all sides within the relief area. By providing reliefs or recesses within the tool body configured to receive the unused cutting edge, this configuration minimizes contact between the unused cutting edge and the tool body because the cutting edge is spaced from the surfaces of the tool body. Such a design also allows machining loads to be transmitted through the cutting insert body into the tool seating surface with little risk of damaging the unused or protected cutting edge.

DETAILED DESCRIPTION OF THE PREFERRED EMBODIMENTS

There is a need for a cutting insert and cutting tool body having different geometries than conventional cutting inserts and tool bodies. Such geometries allow the indexing of the insert in an unconventional manner, thereby allowing the insert to be retained in an insert seat in a more secure manner. With respect to the cutting tool body, the tool body is configured to retain the inserts more securely in their seats and to allow the reduction in the size of the chip pockets between adjacent insert seats. With respect to a fixed cutting tool, the fixed tool is configured to retain an insert more securely in the seat and protect the unused cutting edges of the insert. These features are readily seen by comparing a conventional insert and cutting tool body to an insert and tool body having features of the embodiments discussed below.

Figure 1:
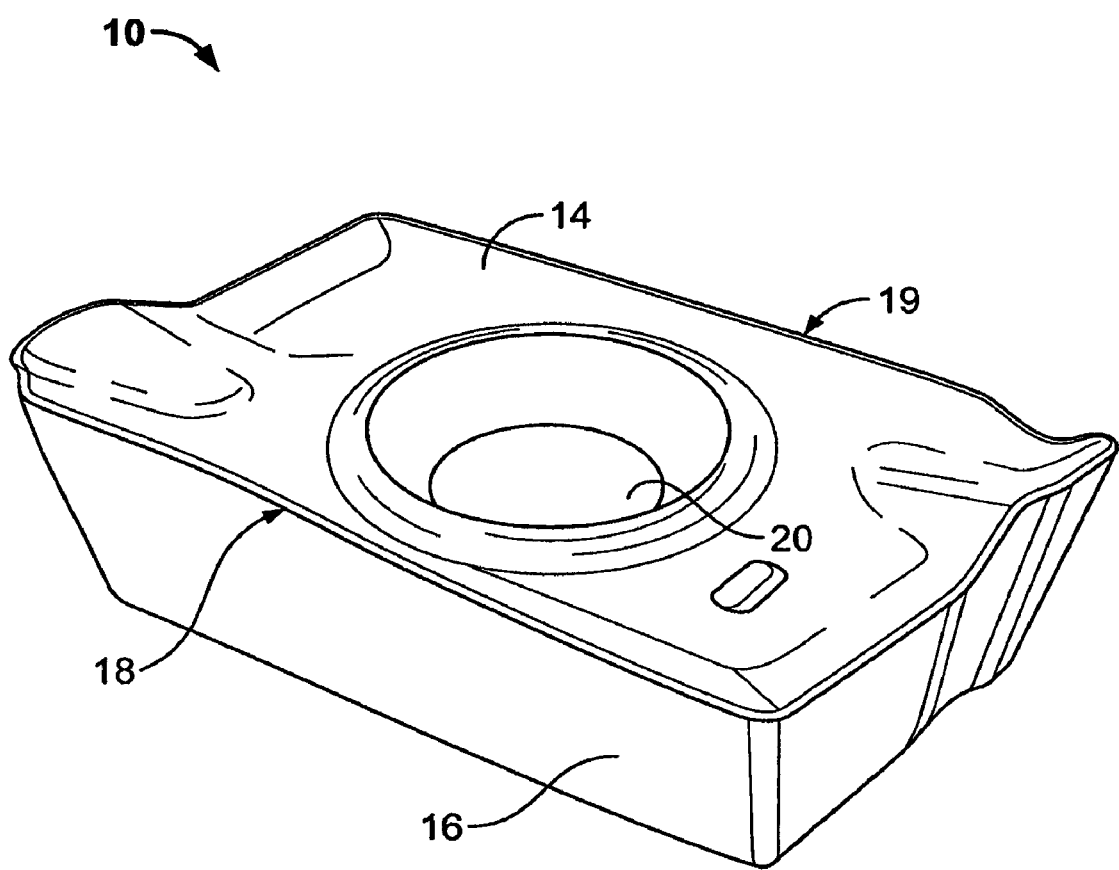
FIG. 1 is a perspective view of a prior art cutting insert.
Figure 10:
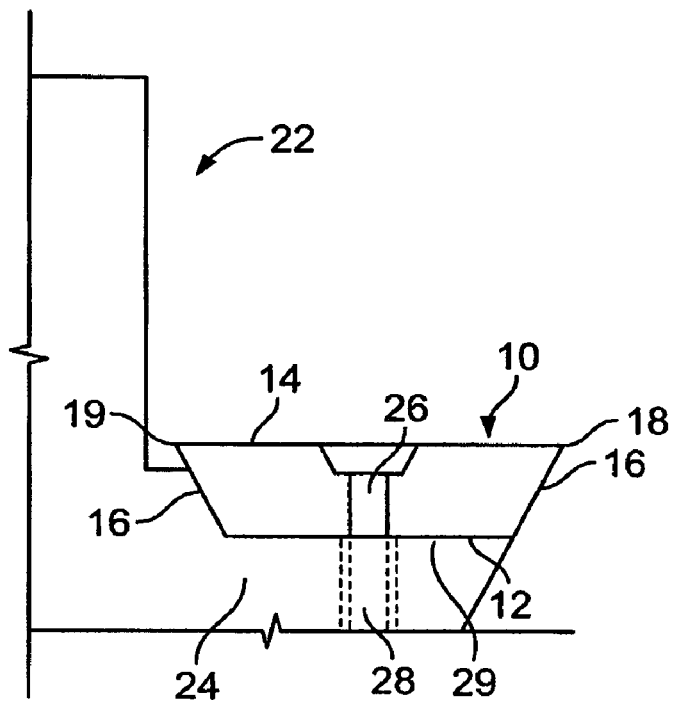
FIG. 10 is a schematic view of a prior art chip pocket and insert.

FIGS. 1 and 10 show a conventional polygonal insert 10, which is commonly used in conventional cutting tools. As seen in FIGS. 1 and 10, a conventional positive geometry insert 10 has a bottom geometric seating surface 12, which has elements that are essentially parallel to a top geometric surface 14 and has a smaller area than the top surface 14. The conventional insert 10 also includes edge surfaces, or side seating surfaces, 16 such that a cross-section of the insert 10, as shown in FIG. 10, is in the approximate shape of a trapezoid. Further, as shown in FIG. 1, the conventional insert 10 has two cutting edges 18 and 19, which are defined by the intersection of the side seating surfaces 16 with the top surface 14. In addition, the conventional insert 10 has a retainer hole 20 extending through the insert 10 such that the axis of the retainer hole 20 is perpendicular to the bottom face 12.

As can be seen from FIGS. 1 and 10, when a portion of one cutting edge 18 becomes worn, the insert 10 may be rotated about hole 20 to allow the second unworn cutting edge 19 to be used during operation of the cutting tool. Thus, with respect to conventional inserts 10, the insert 10 is commonly "indexed," i.e., repositioned so that an unworn cutting edge is placed in the active cutting position, by rotating the insert 10 about the retainer hole axis. When the second cutting edge 19 also becomes worn, the conventional insert is ordinarily discarded and replaced with an unused insert 10. As can be seen in FIG. 10, because the insert 10 is rotated about the retainer hole axis, the insert 10 remains supported by the bottom geometric seating surface 12 both before and after indexing, and a side seating surface 16 positions the insert 10 in the pocket 22.

Figure 2:
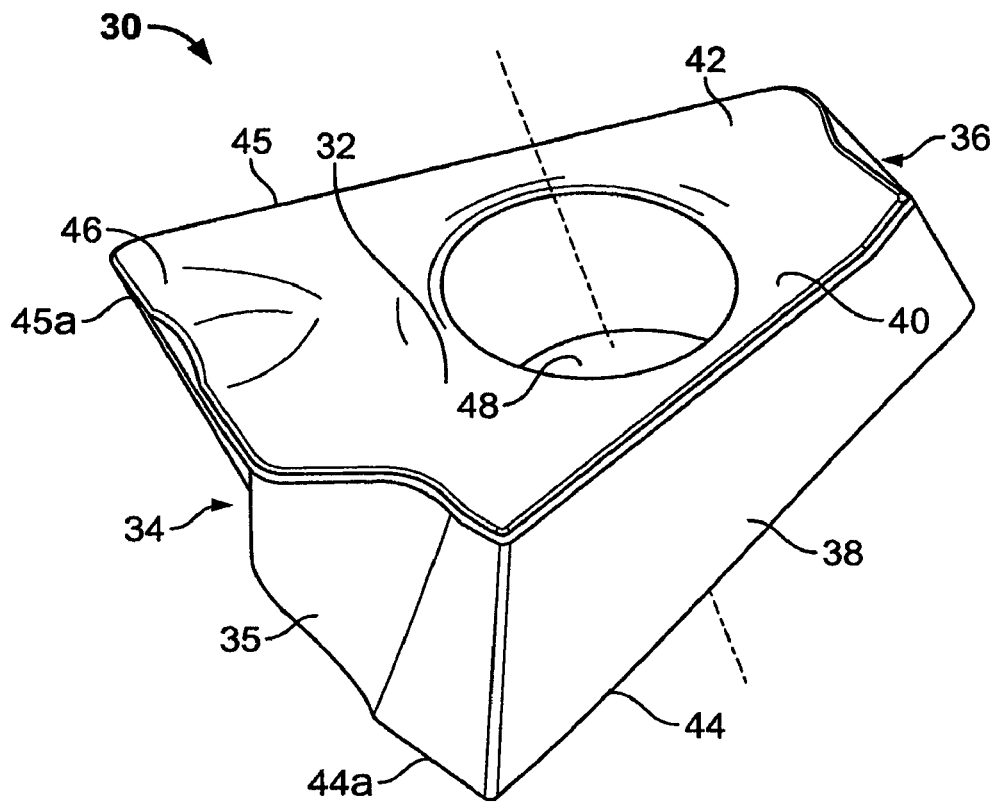
FIG. 2 is a perspective view of a first embodiment of the cutting insert of the present invention for positive geometry cutting.
Figure 3:
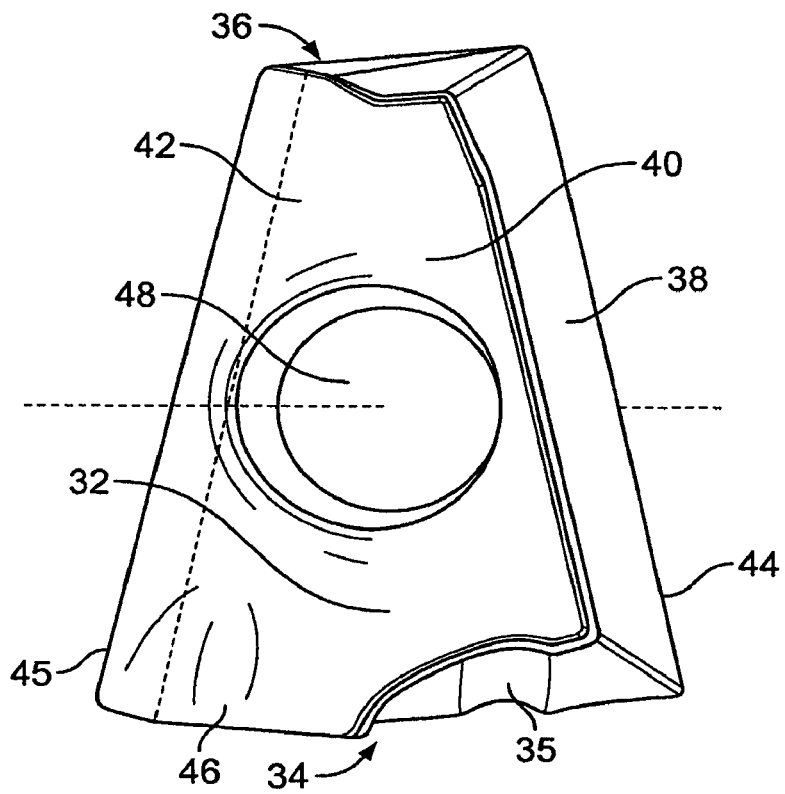
FIG. 3 is a top plan view of the embodiment of the cutting insert shown in FIG. 2.
Figure 4:
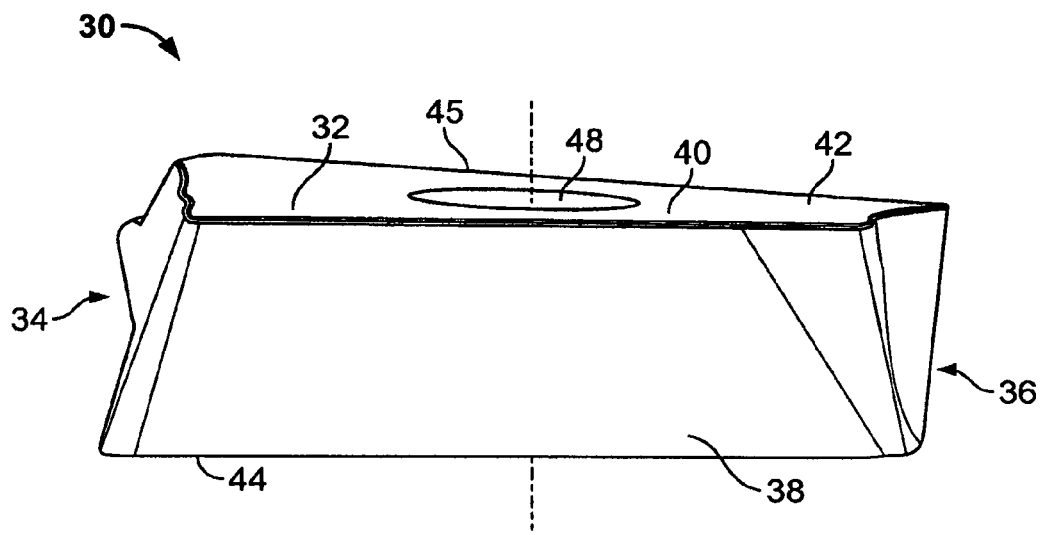
FIG. 4 is a side elevational view of the embodiment of the cutting insert shown in FIG. 2.
Figure 11:
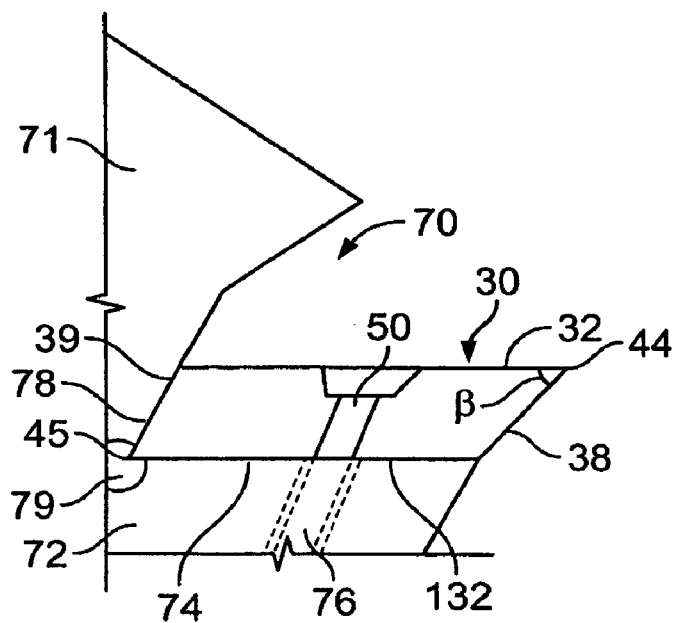
FIG. 11 is a schematic view of an embodiment of the chip pocket and insert of the present invention.

FIGS. 2-5 show a first embodiment of a cutting tool insert 30. The insert 30 is a positive geometry insert composed of a block of hard metal that acts as a suitable cutting material, such as tungsten carbide. As can be seen in FIGS. 2, 3, and 11, the insert 30 has two opposed major faces 32 and 132, which are substantially parallel to one another and substantially identical in shape and area. Each opposed major face 32 or 132 has a truncated pie shape, in which each face 32 or 132 has a broad end 34 that tapers to a narrow end 36.

Figure 5:
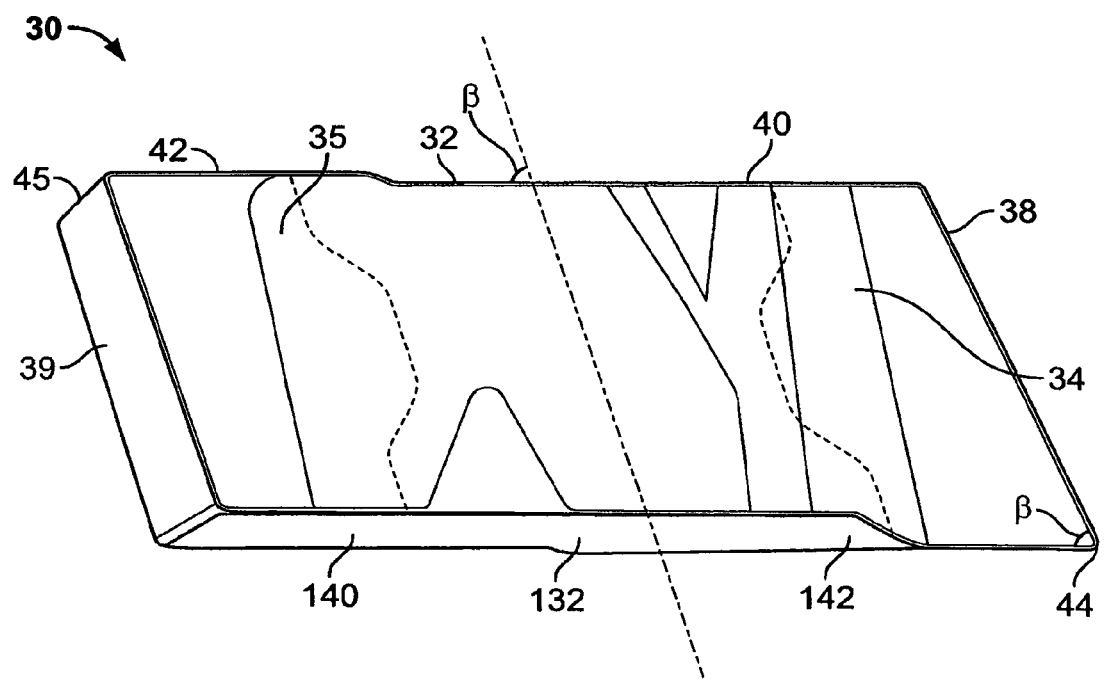
FIG. 5 is a front elevational view of the embodiment of the cutting insert shown in FIG. 2.
Figure 6:
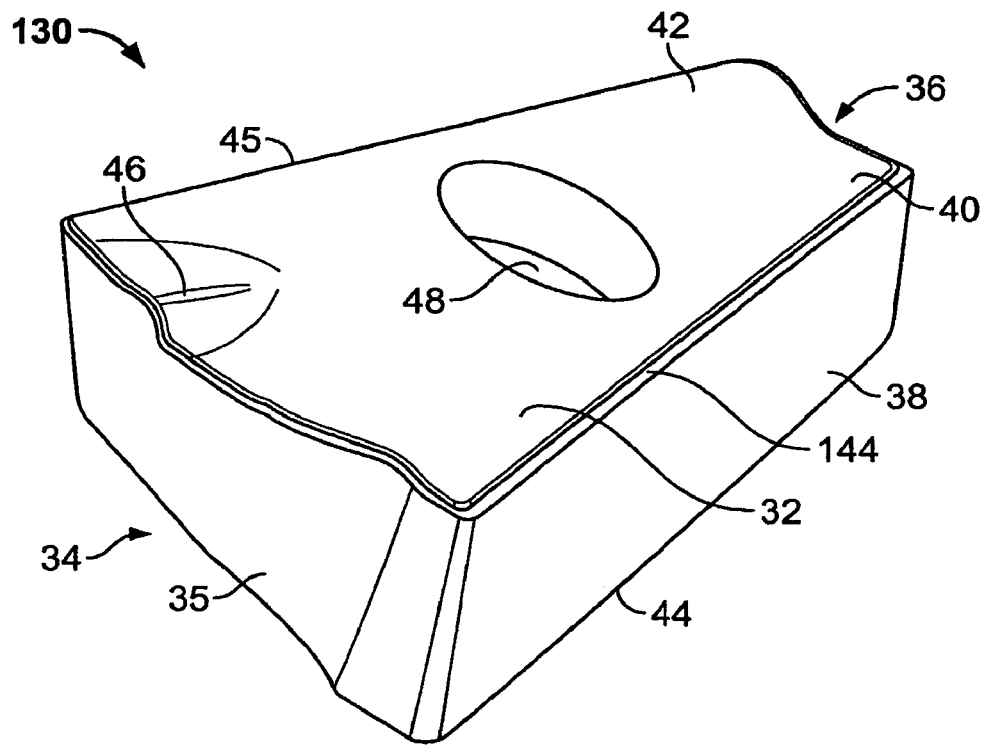
FIG. 6 is a perspective view of a second embodiment of the cutting insert of the present invention for negative geometry cutting.

As can be seen in FIGS. 2, 3, and 11, the insert 30 has first and second edge surfaces, or side seating surfaces, 38 and 39 that form the sides of the insert 30 and that diverge from the broad end 34 of the insert 30 to the narrow end 36. The first and second side seating surfaces 38 and 39 act as clearance faces for rotary cutting action during the machining process. The first and second side seating surfaces 38 and 39 are oriented such that a cross-section of the insert 30, as shown in FIGS. 5 and 11, is substantially in the shape of a parallelogram, when viewed from either the broad end 34 or the narrow end 36. As shown in FIGS. 5 and 11, the side seating surfaces 38 and 39 define a predetermined acute angle β formed by their intersection with the opposed major faces 32 and 132. The angle β may be virtually any angle between 0° and 90°, as desired or as dictated by the nature of the work.

As shown in FIGS. 2, 3, and 5, each opposed major face 32 or 132 is preferably divided into two or more portions: a planar surface 40 or 140 for seating in the pocket and a rake surface 42 or 142 for cutting action and chip control. The surfaces are preferably separated from one another by a plane bisecting the narrow and broad ends 34 and 36 of the insert 30. This bisecting plane preferably divides each opposed major face 32 or 132 approximately in half.

In the first embodiment, each insert 30 includes two cutting edges—a first cutting edge 44 and a second cutting edge 45. As shown in FIGS. 2-5 and 11, the cutting edges 44 and 45 are formed by the intersection of the side seating surfaces 38 and 39 with rake surfaces 42 and 142 of each opposed major face 32 or 132. As shown in FIGS. 5 and 11, the intersection of side seating surfaces 38 and 39 and rake surfaces 42 forms acute angle β. The rake surfaces 42 and 142 preferably have one or more sculptured portions 46 to assist in chip removal and chip breaking during cutting tool operation, as shown in FIGS. 2 and 3. Further, as shown in FIG. 2, the cutting edges 44 and 45 each wrap around the corners at the broad end 34 of the insert 30 in a smooth geometric form, i.e., radius or chamfer, into cutting edge portions 44a and 45a, respectively, and end in a depression central to the broad end 34. The corner geometry at the broad end 34 may be selected to make the corners to a specific geometric shape to accommodate the dimensions of the workpiece being cut.

The cutting edges 44 and 45 therefore are not situated on the same face, or top surface, as in conventional positive geometry inserts shown in FIGS. 1 and 10. The insert 30 therefore is not indexed by simply rotating the insert 30 about a retainer hole axis. Instead, the insert 30 is indexable by "flipping over" the insert, i.e., by repositioning the insert from one opposed major face 32 to the other opposed major face 132, as can be seen from FIG. 11.

As shown in FIGS. 2, 3 and 5, the broad end 34 of the insert 30 is preferably indented between side seating surfaces 38 and 39 to cause the rake surfaces 42 and 142, the cutting edges 44 and 45, and cutting edge portions 44a and 45a to project from the broad end 34. The indented portion 35 of the broad end 34 makes the corners prominent and allows the insert 30 to make effective use of the corners of the insert 30 during operation of the cutting tool. The indented portion 35 also acts as a clearance region during operation of the cutting tool in rotary motion.

As shown in FIGS. 2, 3, 5, and 11, a retainer hole 48 is located in substantially the center of each opposed major face 32 or 132 to allow passage of an insert retainer 50 therethrough, preferably in the form of a retainer screw or other fastening method. The retainer hole 48 extends through the body of the insert 30 from one opposed face 32 to the other face 132 and permits the insert 30 to be mounted to the cutting tool body. As shown in FIGS. 2, 3, and 5, the retainer hole 48 is angled so that the axis of the retainer hole 48 is not perpendicular to the opposed faces 32 and 132. Instead, as shown in FIGS. 3 and 11, the axis defined by the retainer hole 48 is preferably parallel to the non-perpendicular side seating surfaces 38 and 39, i.e., the axis preferably intersects the opposed major faces 32 and 132 to define the same acute angle, η, described above.

FIGS. 6-9 show a second embodiment of the insert 130 having some features that are similar to those of the first embodiment. The second embodiment has two truncated pie-shaped opposed major faces 32 and 132, which are each divided into planar surfaces 40 and 140 and rake surfaces 42 and 142. The second embodiment also has side seating surfaces 38 and 39, forming the sides of the truncated pie shape. Further, the second embodiment has a retainer hole 48 extending through the insert 130.

Figure 9:
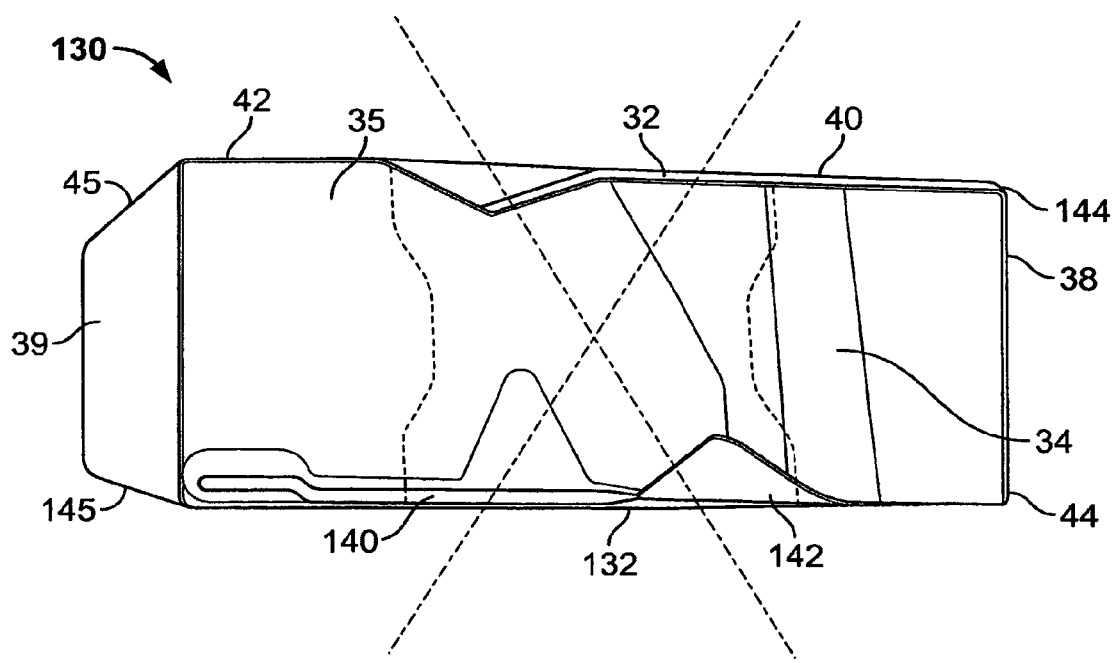
FIG. 9 is a front elevational view of the embodiment of the cutting insert shown in FIG. 6.

FIGS. 6-9 also show differences between the second embodiment and the first embodiment. For example, the second embodiment is a negative geometry insert in which the angle β, i.e., the angle formed by the intersection of the side seating surfaces 38 and 39 and the rake surfaces 42 and 142, is not an acute angle but is instead a ninety degree angle, as shown in FIG. 9. In other words, the side seating surfaces 38 and 39 are perpendicular to the rake surfaces 42 and 142, and a cross-section of the insert 130, when viewed from the broad end 34 or narrow end 36, is essentially in the shape of a rectangle, as shown in FIG. 9.

Figure 7:
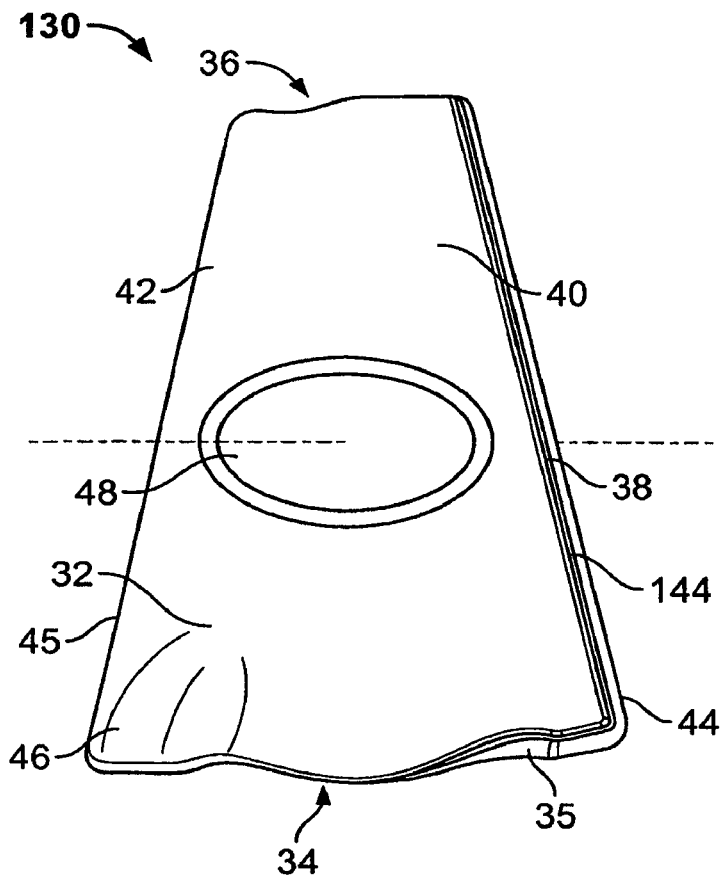
FIG. 7 is a top plan view of the embodiment of the cutting insert shown in FIG. 6.
Figure 8:
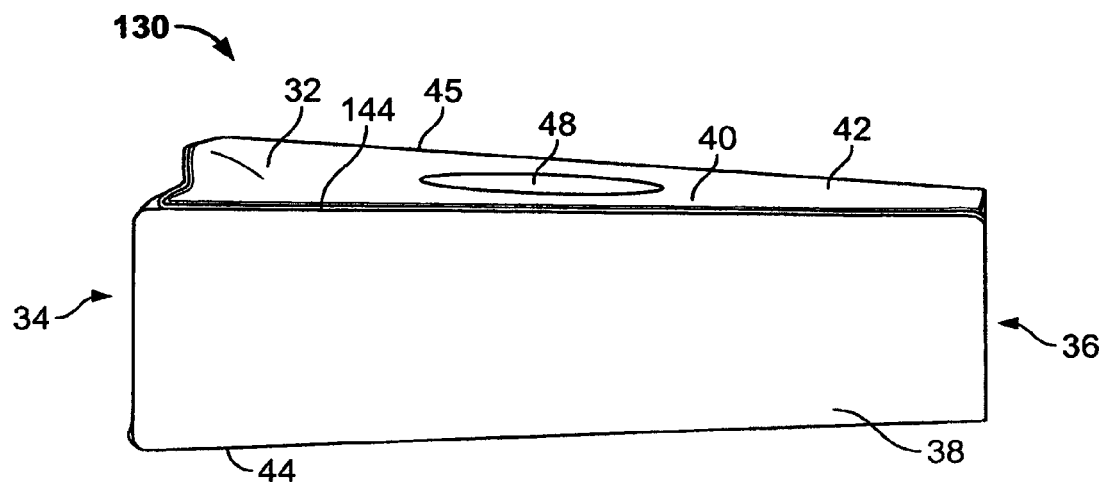
FIG. 8 is a side elevational view of the embodiment of the cutting insert shown in FIG. 6.

Further, the retainer hole 48 of the second embodiment is preferably elongated, as shown in FIG. 7. The elongated shape allows a retainer to be installed through the retainer hole 48 in one of two angled, non-perpendicular orientations. The two orientations of the retainer with respect to the insert 130 allow the use of four cutting edges along the insert 130, instead of two cutting edges.

More specifically, as shown in FIG. 9, the second embodiment has a first cutting edge 44, a second cutting edge 45, a third cutting edge 144, and a fourth cutting edge 145. These cutting edges are formed by the intersection of the side seating surfaces 38 and 39 with the opposed major faces 32 and 132. When the negative geometry insert 130 is used with a cutting tool that rotates in one direction, i.e., clockwise, the insert 130 is indexable between the first and second cutting edges 44 and 45 such that one is in the active cutting position. When both the first and second cutting edges 44 and 45 are worn, the insert 130 may be used with a cutting tool configured to rotate in the opposite direction, i.e., counterclockwise. When used with the latter cutting tool, the insert 130 is indexable such that the unworn third and fourth cutting edges 144 and 145 are alternately in the active cutting position.

The manner of indexing the second embodiment is the same as described above for the first embodiment. The insert 130 is indexed by "flipping over" the insert 30, not by rotating it about the retainer hole axis.

In the preferred embodiments of the positive and negative geometry inserts described herein, a screw 50 is used to retain the inserts 30 and 130. It should be evident, however, that other fastening methods are also available for use in retaining inserts 30 and 130. For example, and without limitation, clamps, wedges, cams, and cam-pins may also be used to hold the inserts 30 and 130 in place.

Figure 12:
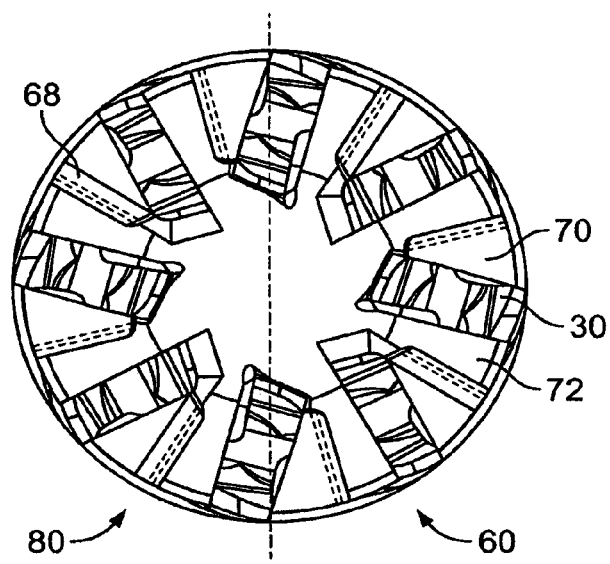
FIG. 12 is a front elevational view of a first embodiment of a cutting tool of the present invention.
Figure 13:
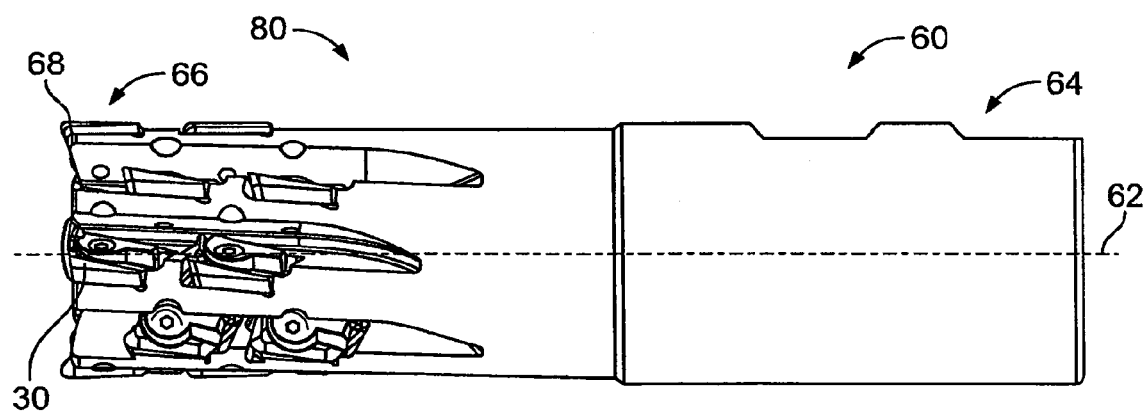
FIG. 13 is a side elevational view of the cutting tool shown in FIG. 12.
Figure 14:
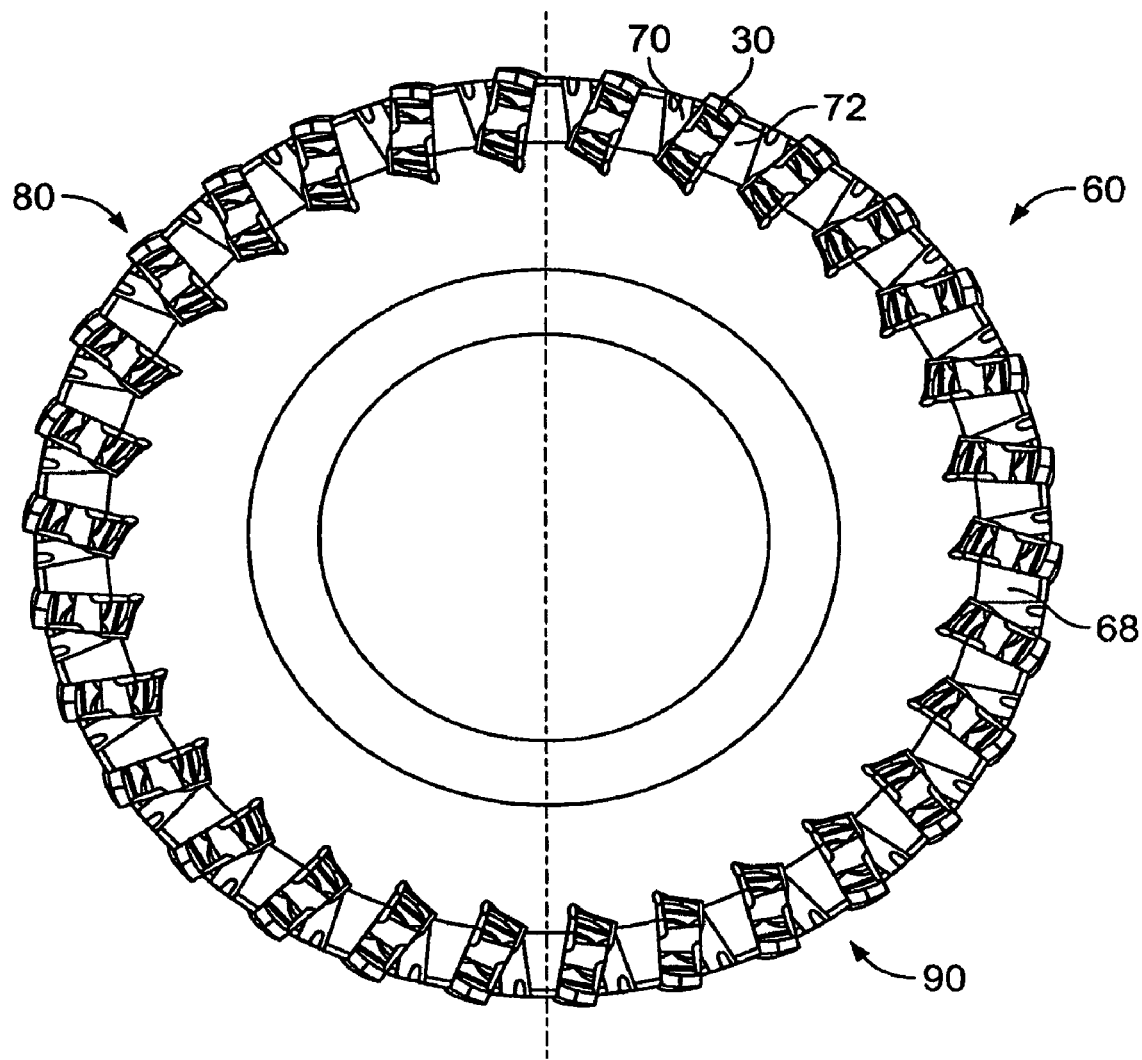
FIG. 14 is a front elevational view of a second embodiment of a cutting tool of the present invention.
Figure 15:
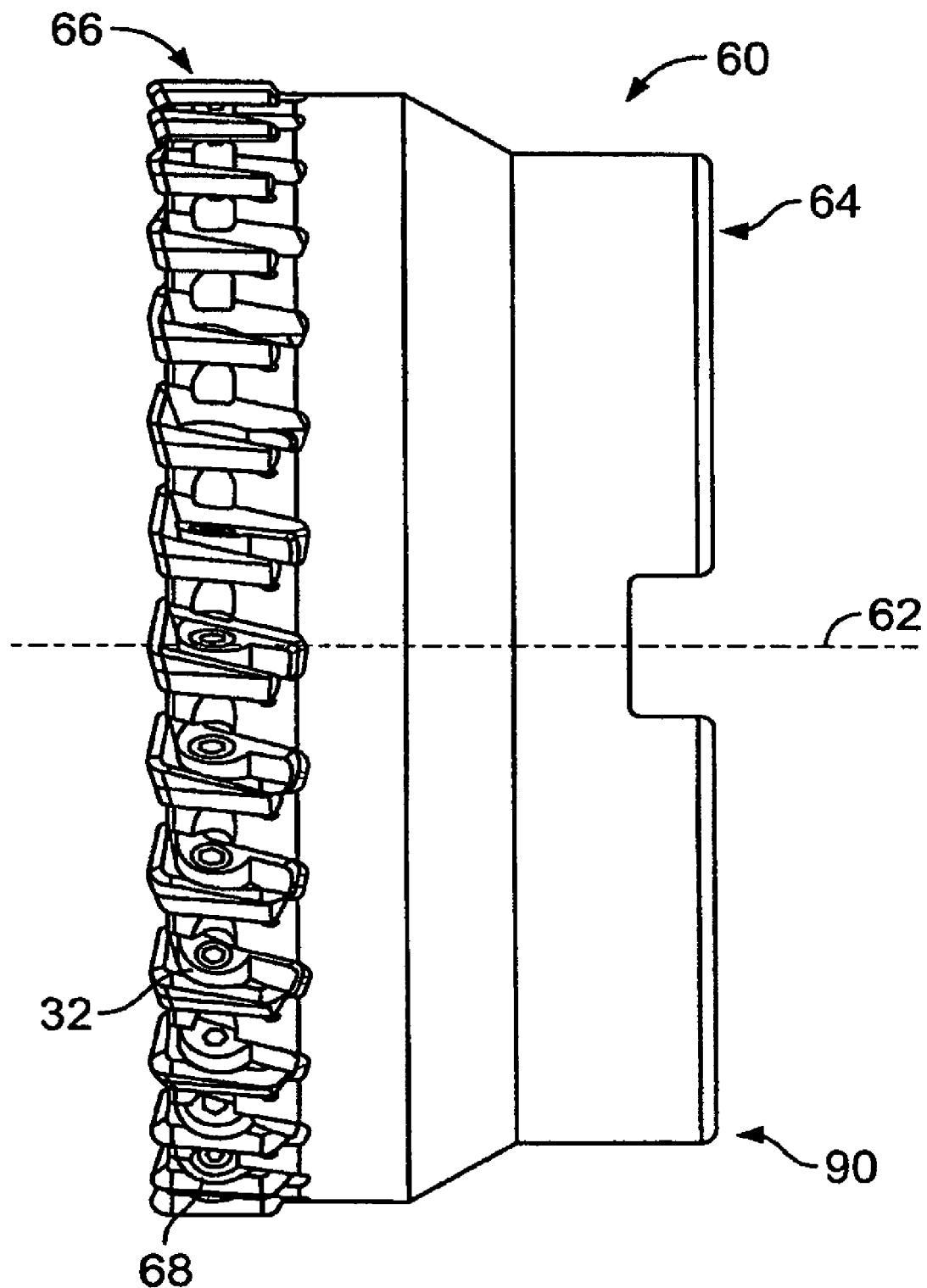
FIG. 15 is a side elevational view of the cutting tool shown in FIG. 14.

The inserts 30 and 130 described above (both positive and negative geometry embodiments) are designed for use in the cutting tool body 60 of a cutting tool, i.e., a milling machine. A first embodiment of a milling machine employing positive geometry inserts 30 is shown in FIGS. 12 and 13, and a second embodiment is shown in FIGS. 14 and 15. The end mill 80 (FIGS. 12 and 13) and the face mill 90 (FIGS. 14 and 15) each include a tool body 60 and a plurality of inserts 30. As shown in FIGS. 12-15, the cutting tool body 60 is substantially cylindrical with a central axis 62 about which it rotates during operation in a predetermined direction. The tool body 60 includes a coupling end portion 64 and a working end portion 66 that is disposed towards a workpiece during operation of the milling machine. The coupling end portion 64 is designed to engage the drive spindle (not shown) of the milling machine for rotation therewith. During operation, a cutting edge of each insert 30 extends beyond the tool body 60 for cutting the workpiece, and the cutting tool body 60 rotates at a predetermined speed bringing the inserts 30 into cutting engagement with the workpiece. The cutting tool body 60 rotates in a counterclockwise direction in FIGS. 12 and 14.

As shown in FIGS. 12-15, the working end portion 66 includes an outer periphery portion 68 defining a number of circumferentially spaced chip pockets 70 for the removed metal material to be discharged during operation in the form of chips. As shown in FIGS. 12 and 14, the chip pockets 70 are located between adjacent insert seats 72, which are also spaced circumferentially about the outer periphery portion 68 of the cutting tool body 60 and which serve as support surfaces for the inserts 30. Each of the insert seats 72 is designed to position, locate, and secure one of the indexable inserts 30 for performing the cutting operation on the workpiece.

The number of insert seats 72 (and therefore the number of inserts 30) depends on the diameter of the cutting tool body 60 and the size of the insert pocket and chip clearance 70. The end mill 80 shown in FIGS. 12 and 13 has sixteen insert seats 72 disposed about the top of the outer periphery portion 68 of the cutting tool body 60. The face mill 90 shown in FIGS. 14 and 15 has thirty insert seats 72 disposed about the outer periphery portion 68. Generally, a larger number of insert pockets 70 (and therefore inserts 30) per diameter results in a higher population of cutting edges, yielding a tool that has a longer cutting life and greater cutting speed and ability.

Features of the cutting insert 30 and chip pocket 70 are readily seen by comparing them to a conventional geometric insert 10 and conventional chip pocket 22. FIG. 10 shows a conventional geometric insert 10 disposed in a conventional chip pocket 22. As can be seen, the conventional insert 10 is mounted in an insert seat 24 by a retainer screw 26 extending approximately perpendicularly through the center of the insert 10 and approximately perpendicularly through a mounting hole 28 in the insert seat 24.

In FIG. 10, the conventional insert 10 and chip pocket 22 are on the outer periphery of a conventional tool body that is rotating in a counterclockwise direction. During operation, active first cutting edge 18 is employed to remove metal from a workpiece, and in so doing, cutting edge 18 experiences cutting forces acting downwardly and radially inwardly against edge 18. In turn, these cutting forces act against the retainer screw 26 and the insert 10 to tend to cause the insert 10 to "flip over" and be ejected from the insert seat 24. A shear force is thereby exerted against the retainer screw 26, which is the primary mechanism for keeping the insert 10 in the insert seat 24. Also, the unused second cutting edge 19 is exposed in the chip pocket 22 to chips that may damage the second cutting edge 19.

Further, with respect to the conventional chip pocket 22, as shown in FIG. 10, steel is generally removed from the conventional tool body to form the chip pocket 22 and to tap the mounting hole 28. Steel is also removed to allow sufficient room above the insert seat 24 for access to the retainer screw 26 with a screwdriver for loosening or tightening of the retainer screw 26. In conventional tool bodies, the axis of the mounting hole 28 is approximately perpendicular to the supporting seat surface 29 to accommodate the retainer screw 26. This orientation, however, requires that a substantial amount of steel be removed in the conventional chip pocket 22 above the insert seat 24 to tap the mounting hole 28, as can be seen in FIG. 10. The removal of this substantial amount of steel weakens the tool body and limits the number of inserts 10 that may be disposed about the outer periphery of the tool body.

FIG. 11 shows the first embodiment of the insert 30 (with positive geometry) disposed in a chip pocket 70. The insert 30 is mounted in an insert seat 72 by an insert retainer 50, preferably a screw, which prevents insert 30 movement during cutting tool operation. As shown in FIG. 11, the insert seat 72 includes a major seating surface 74 located underneath the insert 30 for supporting the insert 30, and having a mounting hole 76 extending through the major seating surface 74 for receiving the insert retainer 50. As shown in FIG. 11, the retainer 50 extends through the center of the insert 30 and through the mounting hole 76 in a non-perpendicular manner. More specifically, the axis defined by the retainer 50 forms a predetermined acute angle, preferably acute angle β discussed above, with respect to planes defined by the opposed major faces 32 and 132 and major seating surface 74.

As shown in FIG. 11, the insert seat 72 also includes a minor seating surface 78 for locating and positioning the insert 30. The minor seating surface 78 is oriented at an angle such that it is in complementary abutting engagement with a side seating surface 38 or 39 of the insert 30 to assist in locating and retaining the insert 30 in the insert seat 72. More specifically, as can be seen in FIG. 11, the minor seating surface 78 is preferably oriented such that it forms predetermined acute angle β when it intersects with major seating surface 74, the same as the acute angle formed by the intersection of side seating surfaces 38 and 39 with opposed major faces 32 and 132 of the insert 30. Further, a third seating surface is preferably in complementary abutting engagement with the narrow end 36 of the insert 30 so that the insert 30 is preferably supported in the insert seat 72 by three seating surfaces. As shown in FIG. 11, the insert seat 72 also includes a recess 79 to allow the seating of unused cutting edge 45 and to prevent damage to the unused cutting edge 45 during operation of the cutting tool.

In FIG. 11, the insert 30 and chip pocket 70 are on the outer periphery of a tool body 60 that is rotating in a counterclockwise direction. During operation, active first cutting edge 44 experiences cutting forces acting downwardly and radially inwardly against edge 44. The orientation of minor seating surface 78 provides a counteracting downward and radially outward force against second edge surface 39 in response to the cutting forces exerted against first cutting edge 44. In other words, the minor seating surface 78 provides the downward and radially outward force to resist "flipping over" of the insert 30, thereby reducing the shear force exerted against the retainer 50. The force needed to retain the insert 30 in the insert seat 72 is provided primarily by the minor seating surface 78, not the insert retainer 50. The resulting reduction in shear force reduces vibration, applies less torque on the retainer 50, and leads to longer life for the insert retainer 50 and for the insert seat 72.

Further, as shown in FIG. 11, the unused second cutting edge 45 is not exposed to potentially damaging loose chips cut during operation of the cutting tool. When the active first cutting edge 44 is in use, the second cutting edge 45 is essentially retracted from the cutting plane of the active edge. As shown in FIG. 11, the second cutting edge 45 is shielded within or near a corner defined by the intersection of the major seating surface 74 and the minor seating surface 78. The geometry of the insert 30 and chip pocket 70 therefore protects the unused cutting edge 45 of the insert 30, resulting in less damage to the unused edge 45 of insert 30.

As can be seen from FIG. 2, the truncated pie shape, or wedge shape, of the insert 30 also helps to protect the unused second cutting edge portion 45*a*. More specifically, the pie shape provides clearance between the second cutting edge portion 45*a* and the workpiece being cut during operation of the cutting tool. Without this clearance, the second cutting edge portion 45*a* would frictionally engage the workpiece when the insert 30 is cutting a workpiece using the first cutting edge 44 and portion 44*a*, thereby damaging the second cutting edge portion 45*a*. The thickness of the truncated pie wedge, i.e., the angle formed by the intersection of side seating surfaces 38 and 39 with the virtual bisecting axis, may vary significantly, so long as it provides sufficient clearance to prevent rubbing of the second cutting edge portion 45*a* against the workpiece.

The orientation of the chip pocket 70 provides additional advantages over conventional cutting tools. In the chip pocket shown in FIG. 11, the mounting hole 76 in major seating surface 74 is oriented at an angle, which requires that substantially less material be removed to tap the mounting hole 76 and form the insert pocket and chip clearance 70. As shown in FIG. 11, the minor seating surface 78 and underlying seat portion extend into a chip pocket wall 71. The wall 71 is dimensioned such that it extends radially outward at an angle, thereby requiring the removal of less steel from the tool body 60 to form the chip pocket 70. The angling of the retainer hole 48 and the mounting hole 76 permits angled access for a tool, such as a screwdriver, for loosening and tightening insert retainer 50, thereby requiring minimum metal removal from the cutting tool body 60 above the major seating surface 74. Reducing the amount of material that needs to be removed from the tool body 60 increases cross-sectional strength, requiring less machining of the tool body 60.

This reduction in dimension and area of the chip pocket 70 has other advantages. First, it allows the outer periphery portion 68 of the tool body 60 to be designed with more inserts 30 for a given tool diameter. The resulting reduction in the size of the chip pocket 70 allows for higher density of inserts 30 (and therefore cutting edges) in both end mill and face mill applications, as well as other applications, with resulting smoother cutting action and greater metal removal rates. The increase in cutting inserts 30 for a given tool diameter allows higher feed rates due to an increased number of cutting edges per revolution of the tool. Second, the change in dimension reduces the amount of recesses in the cutting tool, thereby increasing the cross-section of the tool body 60 and resulting in a stronger, stiffer cutting tool that is more durable and has a longer useful life.

FIG. 11 shows the first embodiment of the insert 30 disposed in a chip pocket 70, but the second embodiment (as well as other embodiments) of the insert 30 may also be used. The insert seat 72, including minor seating surface 78, can be dimensioned to accommodate the second embodiment. The axis of the retention hole would again be angled in both the insert 30 and insert seat 72 to provide angled access of an insert retainer 50. The used of the angled access provides the advantages described above. In addition, the retainer hole 48 is preferably elongated to accommodate an insert retainer 50 along one of two angled axes, as shown in FIG. 9. As a result, as described above, the insert 30 may employ four cutting edges (not just two): two cutting edges for use with a cutting tool rotating in a clockwise direction and two other cutting edges for use with a cutting tool rotating in a counterclockwise direction.

Figure 16:
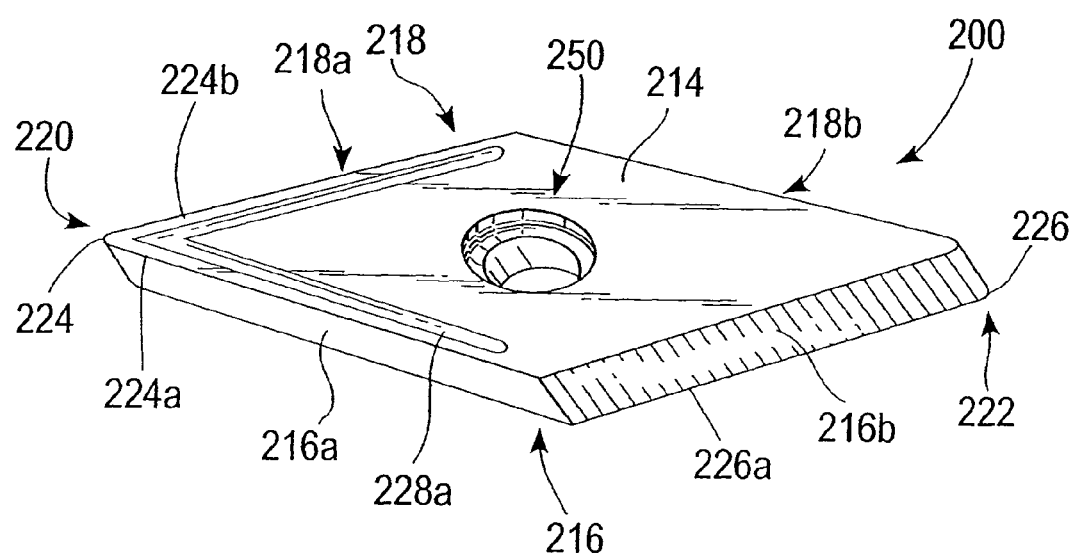
FIG. 16 is a perspective view of another embodiment of the cutting tool insert for fixed cutting tool applications showing an upper major face and cutting edges thereon.
Figure 17:
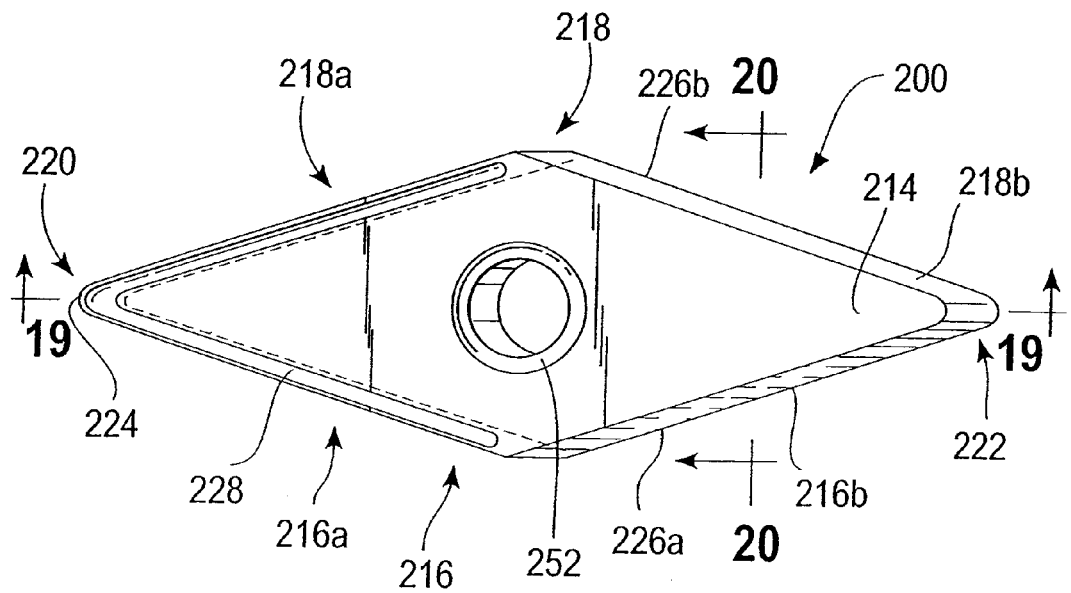
FIG. 17 is a top plan view of the embodiment of the cutting tool insert of FIG. 16 showing the contrasting inclines between insert side walls.
Figure 18:
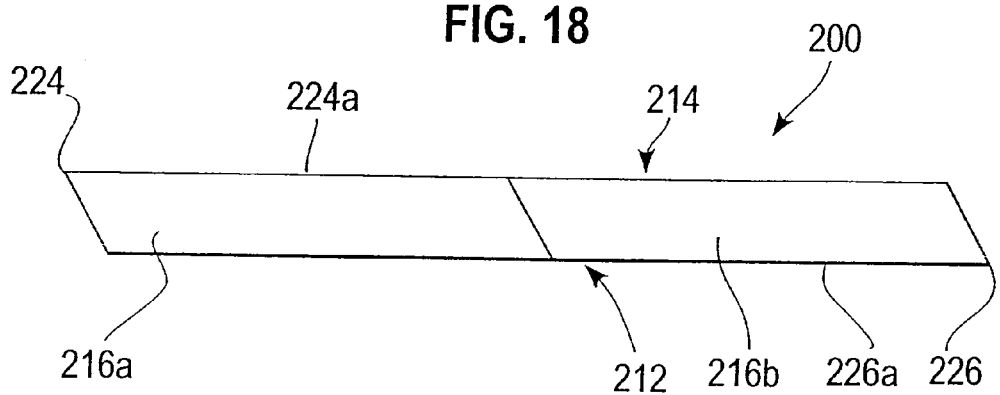
FIG. 18 is a side elevational view of the embodiment of the cutting tool insert of FIG. 16 showing the cutting edges and cutting points on the upper and lower major faces.

FIGS. 16-20 show a third embodiment of a cutting tool insert 200 for use with fixed tool applications where the cutting tool insert is held substantially fixed, such as in a lathe. The insert 200 is composed of a block body of hard metal, such as tungsten carbide, that acts as a suitable cutting material. The insert 200 may be formed into a variety of shapes, including squares, circle, hex, and parallelograms, although FIGS. 16-20 illustrate a generally diamond-shaped insert 200 suitable for use in a lathe. As seen in FIGS. 16 and 18, the cutting tool insert 200 has a lower major face 212 that is spaced from and generally parallel to an upper major face 214. The cutting tool insert 200 includes a first side wall 216 that is generally formed by side wall portions 216*a*, 216*b* extending between the upper major face 214 and lower major face 212. Similarly, a second side wall 218 is generally formed by side wall portions 218*a*, 218*b*. A first pair of side wall portions 216*a*, 218*a* taper inwardly toward each other and meet to define a first end 220, while a second pair of side wall portions 216*b*, 218*b* taper toward each other to define a second end 222, as shown in FIGS. 16 and 17.

Figure 20:
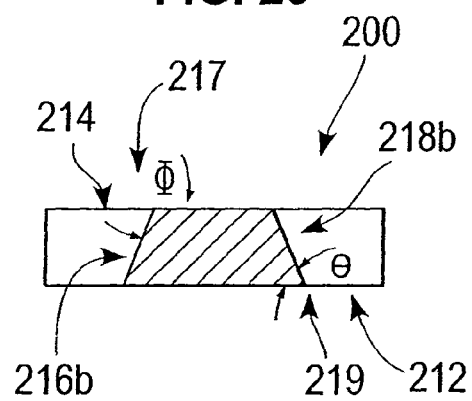
FIG. 20 is a cross-sectional view of the embodiment of the cutting tool insert of FIG. 17 taken along line 20-20 showing a second pair of side walls that are broader near the lower major face of the insert.

The pairs of side wall portions 216*a*, 218*a* and 216*b*, 218*b* are also inclined relative to the upper and lower major faces 212, 214 to form intersections or corner junctures with these surfaces at either obtuse or acute angles, as best shown in FIGS. 17 and 20. More specifically, the first pair of side wall portions 216*a*, 218*a* form corner junctions with the upper major face 214 at acute angles to form a truncated "V" shape that is broader near the upper major face 214 and narrower near the lower major face 212. The second pair of side wall portions 216*b*, 218*b* are inverse to the first pair, meaning that the side wall portions 216*b*, 218*b* form corner junctions with the upper major face 214 at obtuse angles. Moreover, the side wall portions 216*b*, 218*b* form corner junctions with the lower major face 212 at acute angles to create a truncated "V" shape with the lower major face 212 that is broader near the lower major face 212 and narrower near the upper major face 214. For example, FIG. 20 illustrates the second pair of side wall portions 216*b*, 218*b* forming corner junctures 217 with the upper major face 214 at an obtuse angle $\Phi$ and forming corner junctures 219 with the lower major face 212 at an acute angle $\theta$. Angles $\Phi$ and $\theta$ may be virtually any angle and may be different for the two side wall portions 216*b*, 218*b*. As will be discussed below, the inclines of the pairs of side wall portions 216*a*, 218*a* and 216*b*, 218*b* permit the cutting tool insert 200 to be received in a dovetail slot on the fixed tool. Accordingly, the inclines of the pairs of side walls should be selected to engage corresponding features and angles within the dovetail slot.

In a preferred form, the opposing inclines are equal, but opposite, to each other. In other words, the angles between the upper major face 214 and first side wall portions 216*a*, 218*a* are generally equivalent to the angles between the lower major face 212 and the second side wall portions 216*b*, 218*b*. Similarly, the angles between the lower major face 212 and the first side wall portions 216a, 218a are equivalent to the angles between the upper major face 214 and the second side wall portions 216b, 218b.

As can be seen in FIGS. 16-19, the insert 200 has upper cutting edges 224a, 224b formed at an upper corner juncture of the upper major face 214 and the first pair of side walls 216a, 218a. However, the insert 200 lacks cutting edges at the upper corner juncture of the upper major surface 214 and the second pair of side wall portions 216b, 218b. Instead, a set of lower cutting edges 226a, 226b are located at a lower corner juncture of the second pair of side wall portions 216b, 218b and the lower major face 212. Thus, cutting edges 224a, 224b and 226a, 226b are positioned along opposite major faces 212, 214 and at opposite ends of the diamond-shaped insert 200. In other words, the cutting edge pairs 224a, 224b and 226a, 226b are not situated on the same major face and are diagonally oppositely oriented across the block body 200 from each other. The insert 200, therefore, is not indexed by simply rotating the insert about an axis normal to the upper major face 214 as with prior inserts. Instead, the insert 200 is indexable by "flipping" the insert "end-over-end", i.e., by repositioning the insert from the lower major face 212 to the upper major face 214.

Additionally, the insert 200 has a first cutting point 224 formed at the intersection of the upper cutting edges 224a, 224b on the upper major face 214. Similarly, a second cutting point 226 is formed at the intersection of the lower cutting edges 226a, 226b on the lower major face 212. Although the cutting edges are preferably straight, the cutting edges may be of different shapes for different applications, such as to create a different size or style of cut on the workpiece. Further, one or both of the cutting points 224, 226 may also be formed to have a radius or curve to accommodate the shape of a particular work piece. To assist in chip removal, upper and lower channels or rake portions 228, 230 are positioned adjacent the cutting edges to assist in directing chips away from the cutting edge during operation. Rake portions may be inclined surfaces, bevels, or indentations in the major faces. Further, the pairs of side wall portions 216a, 218a and 216b, 218b may be broader adjacent the cutting edges 224a, 224b and 226a, 226b so that the incline of the side walls provides clearance for the insert 200 to function. Stated differently, the side wall portions 216a, 218a and 218b, 218b taper inward from the adjacent cutting edges 224a, 224b and 226a, 226b which tends to direct chips away from the cutting tool.

Figure 19:
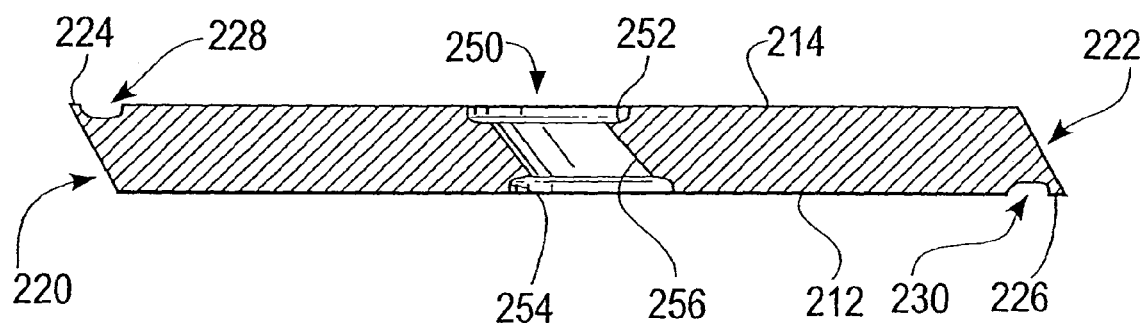
FIG. 19 is a cross-sectional view of the embodiment of the cutting tool insert of FIG. 17 taken along line 19-19 showing an inclined bore and channels formed in the upper and lower major faces.
Figure 23:
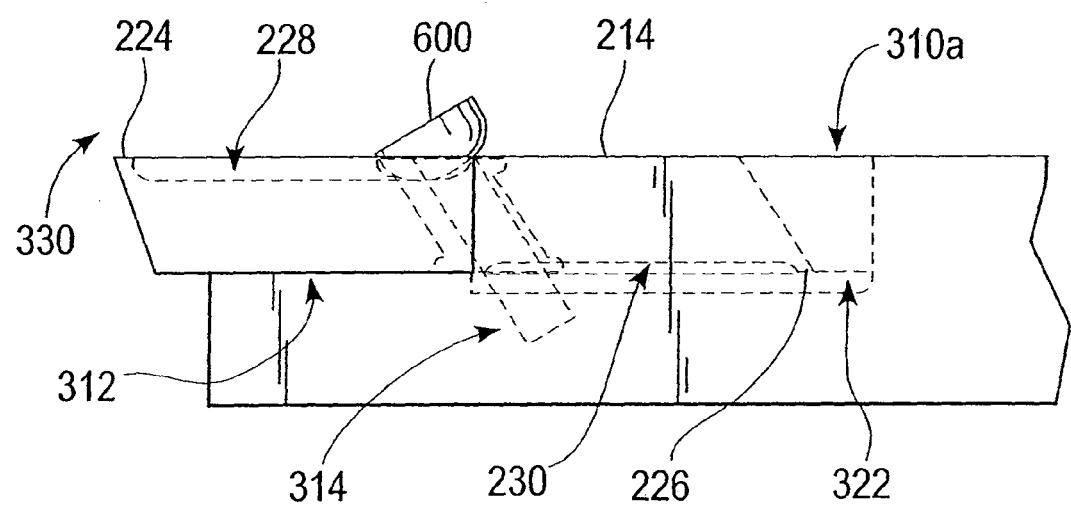
FIG. 23 is a side elevational view of the cutting tool insert and fixed tool of FIG. 21 showing the unused cutting edges of the insert positioned within a recess on the fixed tool.

The cutting tool insert 200 also has an angled bore 250 extending through the major faces 212, 214 and is configured to receive part of a retainer 600 to secure the insert 200 to a fixed tool, as shown in FIGS. 19 and 23. Chamfered surfaces 252, 254 are positioned at either end of the bore 250 for receiving a tapered portion of the retainer 600. Bore wall 256 is a generally cylindrical wall sized to accommodate an elongate portion of retainer 600. In an alternative embodiment, bore wall 256 includes threads or other features that engage the elongate portion of the retainer 600. By one approach, the bore 250 extends in an inclined direction transverse to the upper and lower major faces 212, 214 to guide the retainer 600 into a fixed tool 300 at an angle no matter which insert major face 212, 214 is engaging the tool, as shown in FIG. 23. When the retainer 600 is driven into the fixed tool 300, the tapered portion of the retainer 600 will rest within one of the chamfered surfaces 252, 254 so that the cutting tool insert 200 is held against the fixed tool 300.

Figure 21:
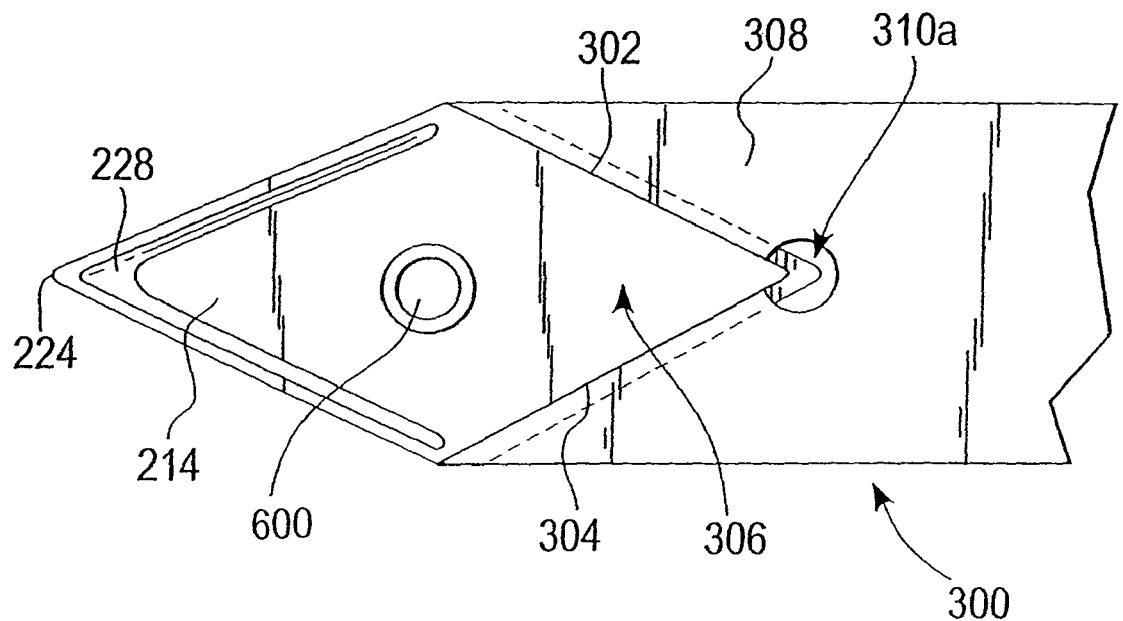
FIG. 21 is a top plan view of another embodiment of the cutting tool insert and fixed tool showing the insert received within a pocket in the fixed tool.

FIG. 21 shows the insert 200 securely received in the fixed tool 300. The fixed tool 300 has a pocket 310 with inner edges 302, 304 that form an opening 306 in a top surface 308 of the tool. The pocket 310 extends downward into the fixed tool body and includes as flat or major seating surface 312. When the insert 200 is placed into the pocket 310, lower major face 212 of the cutting insert 200 is seated on the major seating surface 312 to support the insert 200 during operation. Additionally, the major seating surface 312 includes a bore 314, preferably threaded, to receive the retainer 600 and secure the insert 200 to the major seating surface 312 of the tool 300.

When the insert 200 is received in the tool pocket 310, one of the insert cutting points 224 or 226 will extend away from the fixed tool 300 and be exposed to engage the workpiece. At the other end of the insert 200, the other cutting point 224 or 226 will extend into the pocket 310 to be protected from chips and flying debris. For example, the first cutting point 224 could be selected to engage the workpiece initially, while the second cutting point 226 rests safely within the pocket 310. Because the cutting points 224, 226 are diagonally oppositely oriented across the tool body, as one cutting point is exposed for cutting, the other cutting point is received in a tip recess 310a formed in the pocket 310, which will be described further below.

The fixed tool 300 also includes dovetail walls 316, 318 inclined at an acute angle relative to the major seating surface 312 and extend inwardly over the major seating surface 312. The incline in the dovetail walls 316, 318 is complementary to match the incline of insert side wall portions 216b, 218b (or 216a, 218a) so that the insert 200 can be held firmly within fixed tool 300. When the retainer 600 is driven into bore 314, the angled orientation tends to draw insert side wall portions 216b, 218b into contact with the dovetail walls 316, 318 and seat the insert 200 within the fixed tool 300. Moreover, the dovetail configuration also helps to hold the insert in the pocket because the dovetail engagement with the insert 200 holds the insert to the major seating surface 312 in a direction generally normal to that surface.

During operation, upper cutting edges 224a, 224b are exposed to remove material from a rotating workpiece, and in so doing, cutting edges 224a, 224b experience cutting forces acting downwardly and radially inward against the edges. In turn, these cutting forces can act against retainer 600 and the insert 200 to generate a force opposite the major seating surface 312. One advantage of the design of dovetail walls 316, 318 is that the incline resists upward rotation of the insert 200 caused by the rotating workpiece by exerting a downward reactive force against the side wall portions 216b, 218b. The transfer of loads from the insert 200 directly into the fixed tool 300 reduces the loads placed on the retainer 600.

Figure 22:
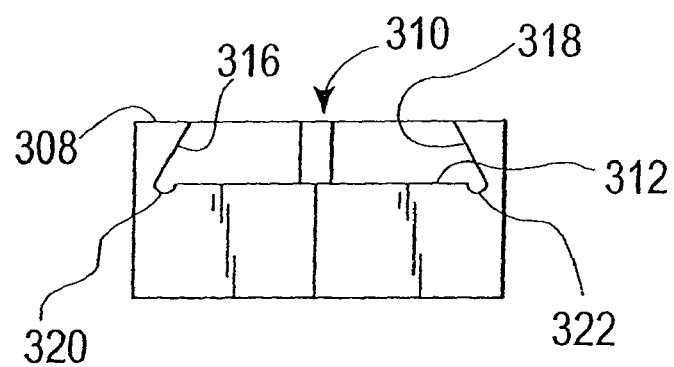
FIG. 22 is a front elevational view of the fixed tool of FIG. 21 with the cutting tool insert removed to show reliefs and recess formed in the fixed tool opening.

Turning to FIG. 22, the major seating surface 312 includes elongate reliefs 320, 322 positioned at an intersection of the major seating surface 312 and the dovetail walls 316, 318. The reliefs 320, 322 create an elongated gap or pocket to receive the lower cutting edges 226a, 226b (or 224a, 224b) that are not exposed for cutting when the insert 200 is installed within the fixed tool 300 (or vise versa). Because cutting edges 226a, 226b are spaced from the major seating surface 312 when received in the pocket 310, the various forces incurred during a machining operation are transmitted through the lower major face 212 of the insert 200 instead of through the cutting edges 226a, 226b. This functionality protects the unused cutting edges 226a, 226b from being damaged during use of the cutting point 224 and cutting edges 224a, 224b, as shown in FIG. 23. Similarly, the tip recess 310a provides a gap to receive the cutting point 226 (which is not exposed for cutting) and the fixed tool 300 also limits the forces communicated to the unused cutting point 226 because of the space formed between the cutting point 226 and the body of the fixed tool 300 in the tip recess 310a. By one approach, the tip recess 310a extends from the major seating surface 312 outward through the tool body outer surface 308 to be exposed at the outer surface thereof.

After the first cutting point 224 and upper cutting edges 224a, 224b become dull, the insert 300 is indexed by removing the retainer 600 and flipping the insert end-over-end, in a direction generally shown by arrow 330 in FIG. 23. The retainer 600 is reinserted through the bore 250 to seat the upper major face 214 against the major seating surface 312. The now-dulled first cutting point 224 is positioned within the tip recess 310a and the upper cutting edges 224a, 224b are received adjacent the reliefs 320, 322. Meanwhile, the second cutting point 226 and lower cutting edges 226a, 226b are fresh and ready to engage the workpiece.

As discussed above, the side wall portions 216a, 218a and 216b, 218b have opposing inclines such that side wall portions 216a, 218a are broader near the upper major face 214 (i.e., spaced farther apart relative to the major face and corner juncture thereof), while side wall portions 216b, 218b are broader near the lower major face 212. The opposite inclines permit each pair of side walls 216a, 218a, and 216b, 218b to engage the dovetail walls 316, 318 when the insert 200 is indexed by flipping end-over-end. More particularly, when the insert 200 was first positioned within the fixed tool 300, lower major face 212 faced major seating surface 312 and the broader parts of side wall portions 216b, 218b were near the major seating surface 312. After the insert 200 was indexed, the upper major face 214 now faces the major seating surface 312 and the broader parts of side wall portions 216a, 218a are near the major seating surface 312. Thus, the opposing inclines of the pairs of side walls permit the insert 200 to be indexed by flipping end-over-end while still providing a firm engagement with dovetail walls 316, 318 in the fixed tool 300.

Figure 24:
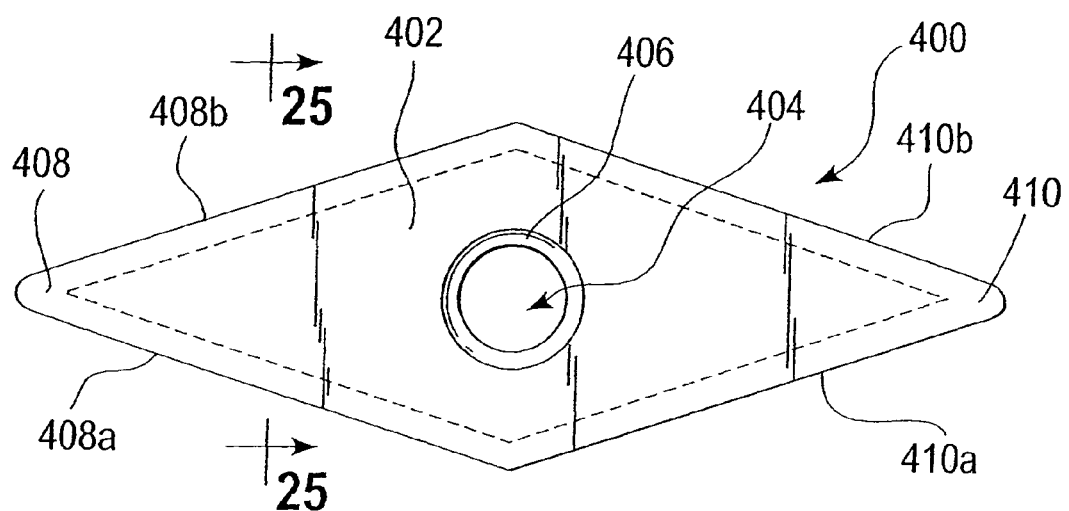
FIG. 24 is a top plan view of a prior art cutting tool insert for prior art fixed tool applications showing cutting edges positioned around the periphery of an upper major face.
Figure 25:
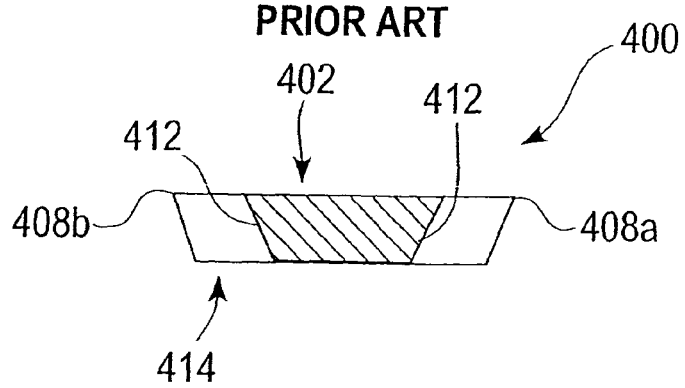
FIG. 25 is a cross-sectional view of the prior art cutting tool insert of FIG. 24 taken along line 25-25 showing inclined side walls that are broader near the upper major face of the insert.

Features of the insert 200 and fixed tool 300 are readily seen by comparing them to a conventional cutting tool insert 400 and conventional fixed tool 500. FIG. 24 shows a conventional insert 400 having an upper major face 402 and a bore 404 formed therethrough. The bore 404 extends through the upper major face 402 at an angle that is perpendicular to the upper major face 402. A chamfered surface 406 configured to receive the head of a retainer 602 extends around the circumference of bore 404. The conventional insert 400 also includes first and second cutting points 408, 410 both positioned on the upper major face 402. The first cutting point 408 is formed at the juncture of first cutting edges 408a, 408b, while the second cutting point 410 is formed at the juncture of second cutting edges 410a, 410b. As shown in FIG. 25, the conventional insert 400 has a lower major face 414 extending parallel to the upper major face 402, with inwardly sloping side walls 412 that join the upper and lower major faces 402, 414. However, the inwardly sloping side walls 412 have a uniform inward slope about the entire periphery of the conventional insert 400. In other words, the spacing between the side walls 412 are all broader near the upper major face 402 than near the lower major face 414 in these prior inserts.

Figure 26:
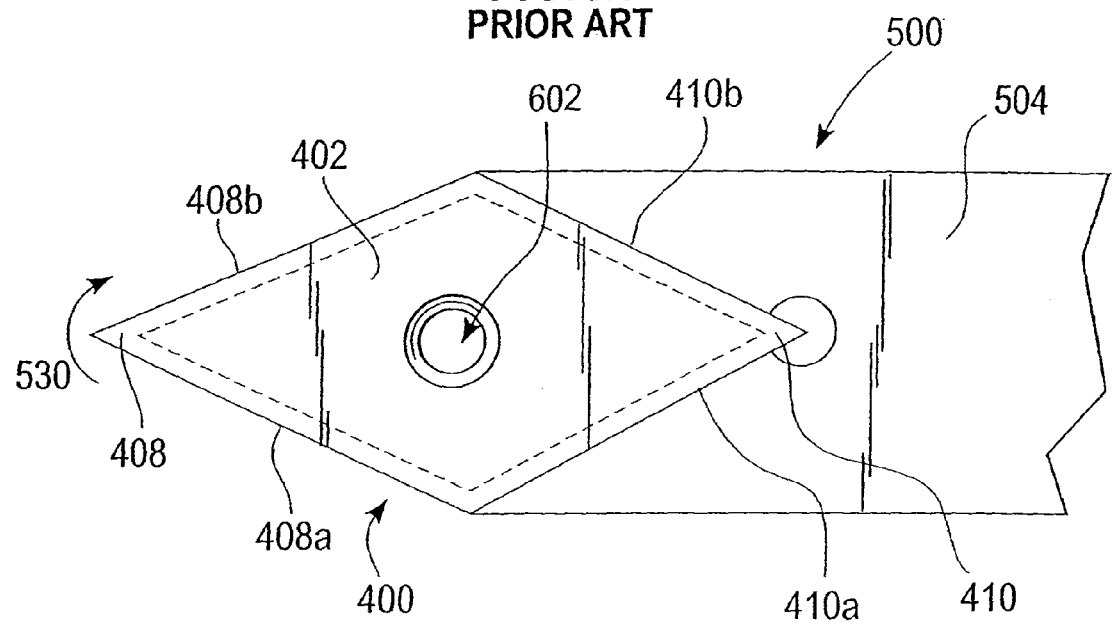
FIG. 26 is a top plan view of a prior art cutting tool insert and prior art fixed tool showing the exposed cutting edges around the periphery of the upper major face when the prior art insert is received within an opening in the prior art fixed tool.
Figure 27:
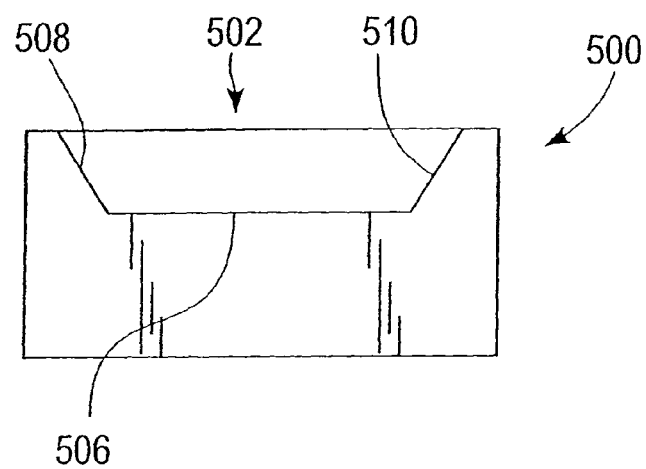
FIG. 27 is a front elevational view of the prior art fixed tool of FIG. 26 with the prior art cutting tool insert removed to show a major seating surface and inwardly sloping side walls of the prior art fixed tool.

In FIG. 26, the conventional insert 400 is installed into a conventional fixed tool 500. The conventional fixed tool 500 has an opening 502 formed in upper surface 504 for receiving the conventional insert 400. The retainer 602 is inserted through the bore 404 and threaded into an aperture in the major seating surface 506. The major seating surface 506 engages the lower major face 414 of the conventional insert 400, while the outwardly inclined surfaces 508, 510 mate with the inwardly sloping side walls 412, as shown in FIG. 27. From FIGS. 25-27, it is apparent that the inclined surfaces 508, 510 lack an engagement with the conventional insert 400 which keeps the insert 400 seated within the opening 502 and resists bending moments applied to the insert 400 by a rotating workpiece. Instead, only the retainer 602 fixes the conventional insert 400 against the major seating surface 506.

In use, FIG. 26 shows that the first cutting point 408 and first cutting edges 408a, 408b of the conventional inserts are exposed to the rotating workpiece and any debris generated therefrom during machining. The second cutting point 410 is also located on the upper major face 402; therefore, the second cutting point 410 and second cutting edges 410a, 410b remain exposed to the rotating workpiece and may be damaged although they are currently not being used. To index the conventional insert 400, the retainer 602 is removed and the insert 400 is rotated about an axis defined by the bore 404 in the direction generally shown by arrow 530 in FIG. 26. The conventional insert 400 is re-seated in the opening 502 before retainer 602 again secures the insert 400 to the major seating surface 506. Regardless of whether the first or second cutting point 408, 410 is facing the workpiece, the lower major face 414 always seats against the major seating surface 506.

As should be evident, a number of variations in the cutting tool and inserts are possible. For example, the cutting tool bodies may be fashioned with a variety of cutting diameters and number of inserts. Also, as shown in FIG. 13, the cutting tool may use multiple rows and other arrangements of inserts on the cutting tool. Further, the inserts are not limited for use with the type of machining tools described above or mentioned in the background but may be used in virtually any metal removal operation, also including without limitation, boring bars, slotters, and broach tools. These considerations will be dictated by the nature of the work to be performed.

While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

What is claimed is:

1. An indexable cutting insert comprising:
   a block body having opposite ends;
   opposite side surfaces of the block body extending between the ends;
   opposite major surfaces of the block body extending between the ends;
   a first pair of side edges extending between one end and the other end at junctures between one of the opposite side surfaces and the opposite major surfaces;
   a second pair of side edges extending from the one end to the other end at junctures between the other of the opposite side surfaces and the opposite major surfaces;
   a first cutting edge formed on one of the first pair of side edges to extend from the one end at the juncture of the one opposite side surface and one of the opposite major surfaces; and
   a second cutting edge formed on one of the second pair of side edges to extend from the other end at the juncture of the other of the opposite side surfaces and the other of the opposite major surfaces so that the first and second cutting edges are diagonally oppositely oriented across the block body from each other.

2. The indexable cutting insert of claim 1 wherein the block body has a longitudinal axis extending between the opposite ends, the opposite major surfaces of the block body being wider at a location intermediate the opposite ends than at the opposite ends.

3. The indexable cutting insert of claim 1 wherein the opposite major surfaces of the block body are wider at one end of the body than at the other end so that the opposite side surfaces of the block body taper inward toward one another.

4. The indexable cutting insert of claim 2 wherein the opposite side surfaces each include a pair of side wall portions, one of the side wall portions inclined relative to one of the opposite major surfaces to form an acute angle therebetween and the other of the side wall portions inclined relative to the other of the opposite major surfaces to form an acute angle therebetween.

5. An indexable cutting insert for cutting tool applications, the indexable cutting insert comprising:
   a block body having upper and lower opposed major faces and opposite ends thereof with a longitudinal axis extending between the opposite ends, the major faces of the block body being wider at a location intermediate the opposite ends than at the opposite ends;
   opposite side walls extending between the major faces, the side walls forming junctures with each other at the opposite ends;
   an upper corner juncture between one of the opposite side walls and the upper major face and a lower corner juncture between the one side wall and the lower major face;
   an upper cutting edge extending along the upper juncture between the intermediate location and one of the opposite ends; and
   a lower cutting edge extending along the lower juncture between the intermediate location and the other of the opposite ends such that the lower cutting edge is located diagonally across the one side wall from the upper cutting edge.

6. The indexable cutting insert of claim 5, wherein the insert includes:
   another upper corner juncture between the other of the opposite side walls and the upper major face;
   another lower corner juncture between the other of the opposite side walls and the lower major face;
   another upper cutting edge extending along the other upper corner juncture between the intermediate location and the one of the opposite ends; and
   another lower cutting edge extending along the other lower corner juncture between the intermediate location and the other of the opposite ends such that the other lower cutting edge is diagonally across the other opposite side wall from the other upper cutting edge.

7. The indexable cutting insert of claim 5, wherein the one of the opposite side walls includes a pair of side wall portions each of which extend from the intermediate location towards one of the opposite ends of the block body, one of the pair of side wall portions forming a corner juncture with the upper major face at an acute angle and the other of the pair of side wall portions forming a corner juncture with the lower major face at an acute angle such that the side wall portions are inclined relative to the upper major face in opposite directions.

8. The indexable cutting insert of claim 7, wherein the one of the pair of side wall portions forms a corner junction with the lower major surface at an obtuse angle and the other of the pair of side wall portions forms a corner junction with the upper major surface at an obtuse angle.

9. The indexable cutting insert of claim 5, wherein each of the opposite ends includes a cutting tip thereon such that the cutting tips are diagonally oppositely oriented across the block body from each other.

10. The indexable cutting insert of claim 5, wherein the major faces include a raked surface portion proximate to cutting edges to assist in directing chips away from the cutting edges during machining.

11. A cutting tool configured for use with an indexable cutting insert and for machining moving workpieces, the cutting tool comprising:
    a cutting tool holder adapted to be held in a fixed relation to a moving workpiece;
    an indexable cutting insert having upper and lower opposed major faces and a side wall extending between the major faces, an upper cutting edge extending along a portion of an upper corner junction between the side wall and the upper major face, and a lower cutting edge extending along a portion of a lower corner juncture between the side wall and the lower major face;
    a seating pocket formed in a working end of the cutting tool holder and configured for receiving the indexable cutting inert therein;
    a seating surface of the seating pocket for supporting one of the upper or lower major faces of the indexable cutting insert thereon so that one of the upper or lower cutting edges is exposed for cutting;
    a side wall of the seating pocket inclined over the seating surface and arranged to hold the indexable cutting insert in the pocket in a direction generally normal to the seating surface;
    a recess in the pocket at an intersection of the side wall and the seating surface arranged to form a relief area in the seating surface to receive the other of the upper or lower cutting edges in the relief area for protection thereof during machining with the exposed cutting edge of the indexable cutting insert.

12. The fixed cutting tool of claim 11, wherein the cutting tool holder has a tool axis extending therealong and a transverse axis extending normal to the seating surface, and the side wall of the seating pocket includes a pair of opposed side walls that incline toward each other in the direction of the transverse axis and form a dovetail arrangement relative to the seating surface to hold the indexable cutting insert in the pocket in a direction generally normal to the seating surface.

13. The fixed cutting tool of claim 12, wherein the indexable cutting insert has opposite ends thereof with each end of the insert including a cutting tip thereon oriented diagonally across the block body of the cutting insert, the pair of opposed side walls on the cutting tool holder extend toward each other in the direction of the tool axis and form a tip recess adjacent an intersection of the opposed side walls, the tip recess arranged and sized to receive one of the cutting tips therein for protection with the other cutting tip exposed for cutting.

14. A method of indexing an indexable cutting insert on a cutting tool body, the method comprising:
    mounting a lower major surface of the indexable insert on a seat of the cutting tool body;
    exposing one cutting edge of the indexable insert adjacent an upper major surface thereof beyond a periphery of the cutting tool body for cutting therewith so that the upper major surface is spaced further from the seat than the lower major surface;
    orienting another cutting edge of the indexable insert adjacent the lower major surface thereof inward of the periphery of the cutting tool body for protecting the other cutting edge during cutting with the one cutting edge; and
    flipping the indexable insert to reverse the orientation of the upper and lower major surfaces so that the upper major surface of the insert is mounted on the seat and the lower major surface is spaced further from the seat than the upper major surface to reorient the cutting edges so that the other cutting edge adjacent the lower major surface is exposed beyond the cutting tool body periphery for cutting therewith and the one cutting edge adjacent the upper major surface is oriented inwardly of the cutting tool body periphery.

15. The method of claim 14 wherein orienting the other cutting edge inward of the periphery of the cutting tool body includes placing the other cutting edge adjacent a relief formed in the seat for protection.

16. A method of indexing an indexable cutting insert on a cutting tool body, the method comprising:
  mounting one of a pair of opposite major surfaces of the indexable insert on a seat of the cutting tool body;
  exposing one cutting edge of the indexable insert beyond a periphery of the cutting tool body for cutting therewith;
  orienting another cutting edge inward of the periphery of the cutting tool body for protecting the other cutting edge during cutting with the one cutting edge; and
  flipping the indexable insert and mounting the other major surface of the insert on the seat to reorient the cutting edges so that the other cutting edge is exposed beyond the cutting tool body periphery for cutting therewith and the one cutting edge is oriented inwardly of the cutting tool body periphery,
  wherein mounting the opposite major surface of the indexable insert on the seat of the cutting tool body includes passing a fastener through a bore of the indexable insert into the seat and drawing an inclined surface of the indexable insert into contact with a complimentary inclined wall of the seat.

* * * * *